(12) United States Patent
Greenwald et al.

(10) Patent No.: US 7,237,138 B2
(45) Date of Patent: Jun. 26, 2007

(54) SYSTEMS AND METHODS FOR DIAGNOSING FAULTS IN COMPUTER NETWORKS

(75) Inventors: Joseph Greenwald, Madbury, NH (US); Scott Ball, Newmarket, NH (US); Christopher Buia, Dover, NH (US); Jonathan P. Caron, Nottingham, NH (US); David K. Taylor, Durham, NH (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/258,908

(22) PCT Filed: May 7, 2001

(86) PCT No.: PCT/US01/14618

§ 371 (c)(1),
(2), (4) Date: Oct. 29, 2002

(87) PCT Pub. No.: WO01/86444

PCT Pub. Date: Nov. 15, 2001

(65) Prior Publication Data

US 2003/0149919 A1    Aug. 7, 2003

Related U.S. Application Data

(60) Provisional application No. 60/202,296, filed on May 5, 2000, provisional application No. 60/202,298, filed on May 5, 2000, provisional application No. 60/202,299, filed on May 5, 2000.

(51) Int. Cl.
*G06F 11/00* (2006.01)

(52) U.S. Cl. ........................................................ 714/4

(58) Field of Classification Search .................. 714/43, 714/25; 370/242, 248
See application file for complete search history.

(56) References Cited

U.S. PATENT DOCUMENTS

| | | | |
|---|---|---|---|
| 4,827,411 A | 5/1989 | Arrowood et al. | ............ 707/206 |
| 5,127,005 A | 6/1992 | Oda et al. | ...................... 714/26 |
| 5,159,685 A | 10/1992 | Kung | ........................... 395/575 |
| 5,261,044 A | 11/1993 | Dev et al. | .................... 395/159 |
| 5,295,244 A | 3/1994 | Dev et al. | .................... 395/161 |

(Continued)

OTHER PUBLICATIONS

Harry Newton, Newton's Telecom Dictionary, 2004, CMP Books, Twentieth Edition, p. 491.

(Continued)

*Primary Examiner*—Bryce P. Bonzo
(74) *Attorney, Agent, or Firm*—Pillsbury Winthrop Shaw Pittman, LLP

(57) ABSTRACT

A network management system (10) includes a fault diagnosis system (12) connectable to a communications network (20). The fault diagnosis system includes a fault object factory, a path determination module, and a fault diagnosis engine. The fault object factory is constructed and arranged to receive fault data and create fault objects. The path determination module is constructed to determine, in a communications network, a path related to the fault data. The fault diagnosis engine is constructed to perform, using the determined path, a fault analysis on the fault data to diagnose a fault related to the communications network. The network management may also include a help desk system (18), a topology mapper (14) or an impact analyzer (16).

31 Claims, 18 Drawing Sheets

U.S. PATENT DOCUMENTS

| | | | |
|---|---|---|---|
| 5,297,138 A | 3/1994 | Black | 370/254 |
| 5,317,725 A | 5/1994 | Smith et al. | 714/27 |
| 5,367,667 A | 11/1994 | Wahlquist et al. | 395/575 |
| 5,377,196 A | 12/1994 | Godlew et al. | 371/20.1 |
| 5,436,909 A | 7/1995 | Dev et al. | 371/20.1 |
| 5,521,910 A | 5/1996 | Matthews | 370/54 |
| 5,539,877 A | 7/1996 | Winokur et al. | 714/26 |
| 5,559,955 A | 9/1996 | Dev et al. | 395/182.02 |
| 5,568,491 A | 10/1996 | Beal et al. | 714/746 |
| 5,590,120 A | 12/1996 | Vaishnavi et al. | 370/254 |
| 5,608,874 A | 3/1997 | Ogawa et al. | 395/200.15 |
| 5,627,819 A | 5/1997 | Dev | 370/250 |
| 5,649,103 A | 7/1997 | Datta et al. | 395/200.03 |
| 5,666,481 A | 9/1997 | Lewis | 395/182.02 |
| 5,675,741 A | 10/1997 | Aggarwal | 395/200.12 |
| 5,684,800 A | 11/1997 | Dobbins et al. | 370/401 |
| 5,687,290 A | 11/1997 | Lewis | 395/3 |
| 5,691,917 A | 11/1997 | Harrison | 717/6 |
| 5,696,486 A | 12/1997 | Poliquin et al. | 340/506 |
| 5,706,436 A | 1/1998 | Lewis et al. | 395/200.11 |
| 5,727,157 A | 3/1998 | Orr | 395/200.54 |
| 5,729,685 A | 3/1998 | Chatwani et al. | 709/224 |
| 5,734,642 A | 3/1998 | Vaishnavi et al. | 370/255 |
| 5,734,824 A | 3/1998 | Choi | 395/200.11 |
| 5,748,781 A | 5/1998 | Datta et al. | 382/232 |
| 5,751,965 A | 5/1998 | Mayo et al. | 395/200.54 |
| 5,751,967 A | 5/1998 | Raab et al. | 709/228 |
| 5,768,501 A | 6/1998 | Lewis | 395/185.01 |
| 5,777,549 A | 7/1998 | Arrowsmith et al. | 340/506 |
| 5,787,234 A | 7/1998 | Molloy | 395/51 |
| 5,793,362 A | 8/1998 | Matthews et al. | 395/200.54 |
| 5,809,282 A | 9/1998 | Cooper et al. | 709/226 |
| 5,822,302 A * | 10/1998 | Scheetz et al. | 370/245 |
| 5,832,503 A | 11/1998 | Malik et al. | 707/104 |
| 5,850,397 A | 12/1998 | Raab et al. | 370/392 |
| 5,864,662 A | 1/1999 | Brownmiller et al. | 714/43 |
| 5,872,911 A | 2/1999 | Berg | 714/43 |
| 5,889,953 A | 3/1999 | Thebaut et al. | 395/200.51 |
| 5,907,696 A | 5/1999 | Stilwell et al. | 395/500 |
| 5,926,463 A | 7/1999 | Ahearn et al. | 370/254 |
| 5,951,649 A | 9/1999 | Dobbins et al. | 709/238 |
| 5,987,442 A | 11/1999 | Lewis et al. | 706/10 |
| 6,003,090 A | 12/1999 | Puranik et al. | 709/235 |
| 6,006,016 A | 12/1999 | Faigon et al. | 714/48 |
| 6,009,440 A | 12/1999 | Watson et al. | 707/203 |
| 6,012,152 A | 1/2000 | Douik et al. | 714/26 |
| 6,014,697 A | 1/2000 | Lewis et al. | 709/223 |
| 6,026,442 A | 2/2000 | Lewis et al. | 709/229 |
| 6,026,500 A | 2/2000 | Topff et al. | 714/26 |
| 6,032,184 A | 2/2000 | Cogger et al. | 709/223 |
| 6,041,383 A | 3/2000 | Jeffords et al. | 710/200 |
| 6,049,828 A | 4/2000 | Dev et al. | 709/224 |
| 6,055,561 A | 4/2000 | Feldman et al. | 709/200 |
| 6,064,304 A | 5/2000 | Arrowsmith et al. | 340/506 |
| 6,069,895 A | 5/2000 | Ayandeh | 370/399 |
| 6,072,777 A * | 6/2000 | Bencheck et al. | 370/244 |
| 6,079,020 A | 6/2000 | Liu | 713/201 |
| 6,084,858 A | 7/2000 | Matthews et al. | 370/238 |
| 6,101,180 A | 8/2000 | Donahue et al. | 370/352 |
| 6,101,500 A | 8/2000 | Lau | 707/103 |
| 6,112,251 A | 8/2000 | Rijhsinghani | 709/249 |
| 6,115,362 A | 9/2000 | Bosa et al. | 370/248 |
| 6,131,112 A | 10/2000 | Lewis et al. | 709/207 |
| 6,141,720 A | 10/2000 | Jeffords et al. | 710/200 |
| 6,141,777 A | 10/2000 | Cutrell et al. | 714/47 |
| 6,147,995 A | 11/2000 | Dobbins et al. | 370/392 |
| 6,158,011 A | 12/2000 | Chen et al. | 713/201 |
| 6,173,399 B1 | 1/2001 | Gilbrech | 713/153 |
| 6,185,619 B1 | 2/2001 | Joffe et al. | 709/229 |
| 6,195,349 B1 | 2/2001 | Hiscock et al. | 370/360 |
| 6,199,172 B1 | 3/2001 | Dube et al. | 714/4 |
| 6,205,488 B1 | 3/2001 | Casey et al. | 709/238 |
| 6,205,563 B1 | 3/2001 | Lewis | 714/47 |
| 6,208,649 B1 | 3/2001 | Kloth | 370/392 |
| 6,216,168 B1 | 4/2001 | Dev et al. | 709/245 |
| 6,230,194 B1 | 5/2001 | Frailong et al. | |
| 6,233,623 B1 | 5/2001 | Jeffords et al. | 709/316 |
| 6,252,852 B1 | 6/2001 | Rowles et al. | 370/242 |
| 6,296,330 B1 * | 10/2001 | Hall | 305/180 |
| 6,324,590 B1 | 11/2001 | Jeffords et al. | 709/316 |
| 6,338,092 B1 | 1/2002 | Chao et al. | 709/236 |
| 6,345,239 B1 | 2/2002 | Bowman-Amuah | 703/6 |
| 6,349,306 B1 | 2/2002 | Malik et al. | 707/103 |
| 6,377,987 B1 | 4/2002 | Kracht | 709/220 |
| 6,392,667 B1 | 5/2002 | McKinnon et al. | 345/738 |
| 6,393,386 B1 | 5/2002 | Zager et al. | 703/25 |
| 6,408,312 B1 | 6/2002 | Forthman et al. | 707/203 |
| 6,421,719 B1 | 7/2002 | Lewis et al. | 709/224 |
| 6,580,693 B1 * | 6/2003 | Chernyak et al. | 370/248 |
| 6,581,166 B1 * | 6/2003 | Hirst et al. | 714/4 |
| 6,604,208 B1 * | 8/2003 | Gosselin et al. | 714/4 |
| 6,654,914 B1 * | 11/2003 | Kaffine et al. | 714/43 |
| 6,694,314 B1 | 2/2004 | Sullivan et al. | 707/10 |
| 6,876,993 B2 | 4/2005 | LaButte et al. | 706/47 |
| 7,043,661 B2 | 5/2006 | Valadarsky et al. | 714/4 |
| 7,103,807 B2 | 9/2006 | Bosa et al. | 714/43 |
| 2002/0133328 A1 | 9/2002 | Bowman-Amuah | 703/22 |
| 2002/0133756 A1 | 9/2002 | Jain | 714/43 |
| 2003/0069972 A1 | 4/2003 | Yoshimura et al. | 709/226 |
| 2003/0149919 A1 | 8/2003 | Greenwald et al. | 714/43 |
| 2004/0078683 A1 | 4/2004 | Buia et al. | 714/37 |

OTHER PUBLICATIONS

Microsoft Computer Dictionary, 2002, Microsoft Press, Fifth Edition, p. 291.

Peregrine Systems Partners with Motive Communications to Offer IT Solutions that Enhance Employee Self-Service, 1999, Peregrine Systems, Inc., 4 pages.

* cited by examiner

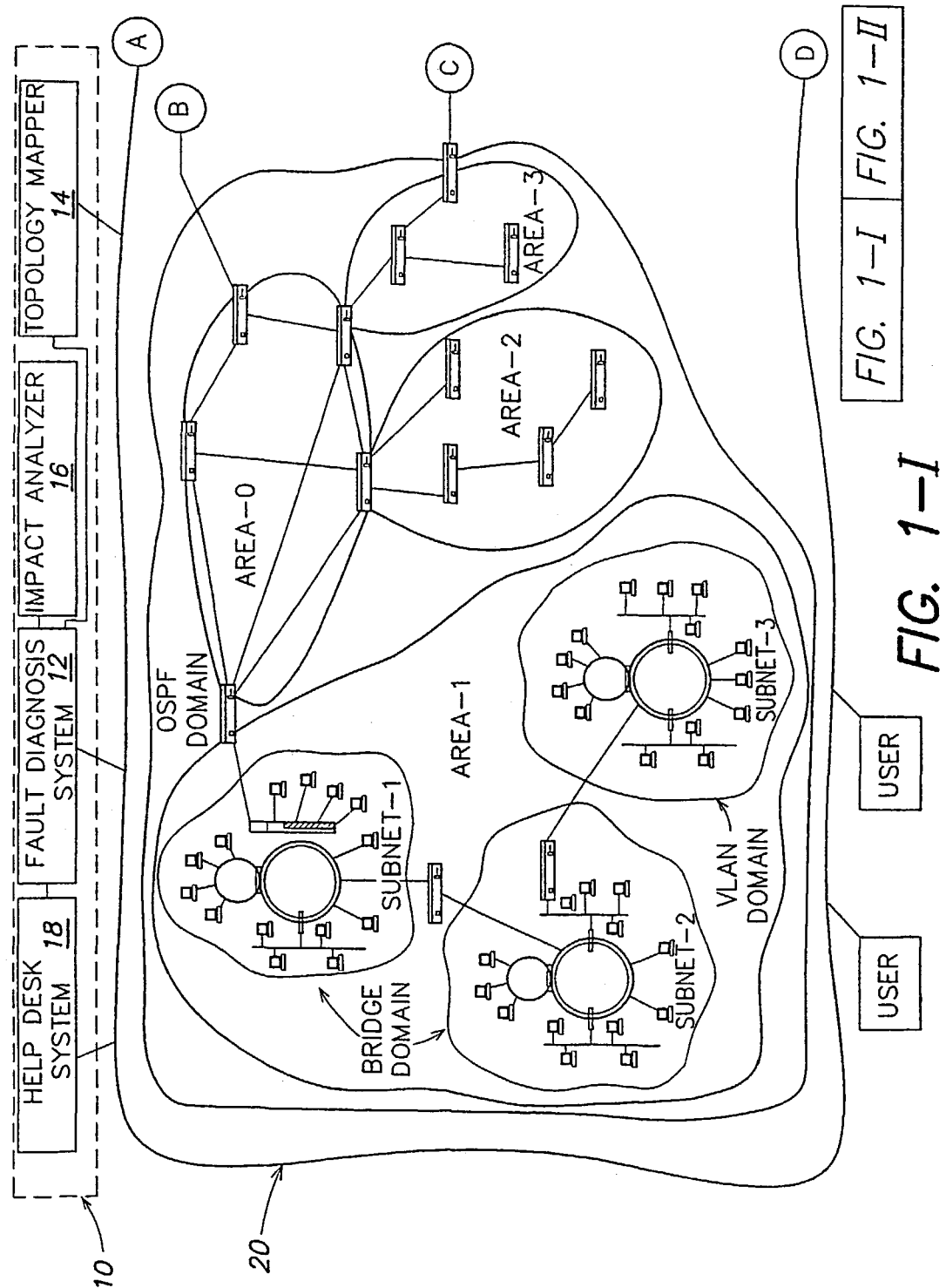

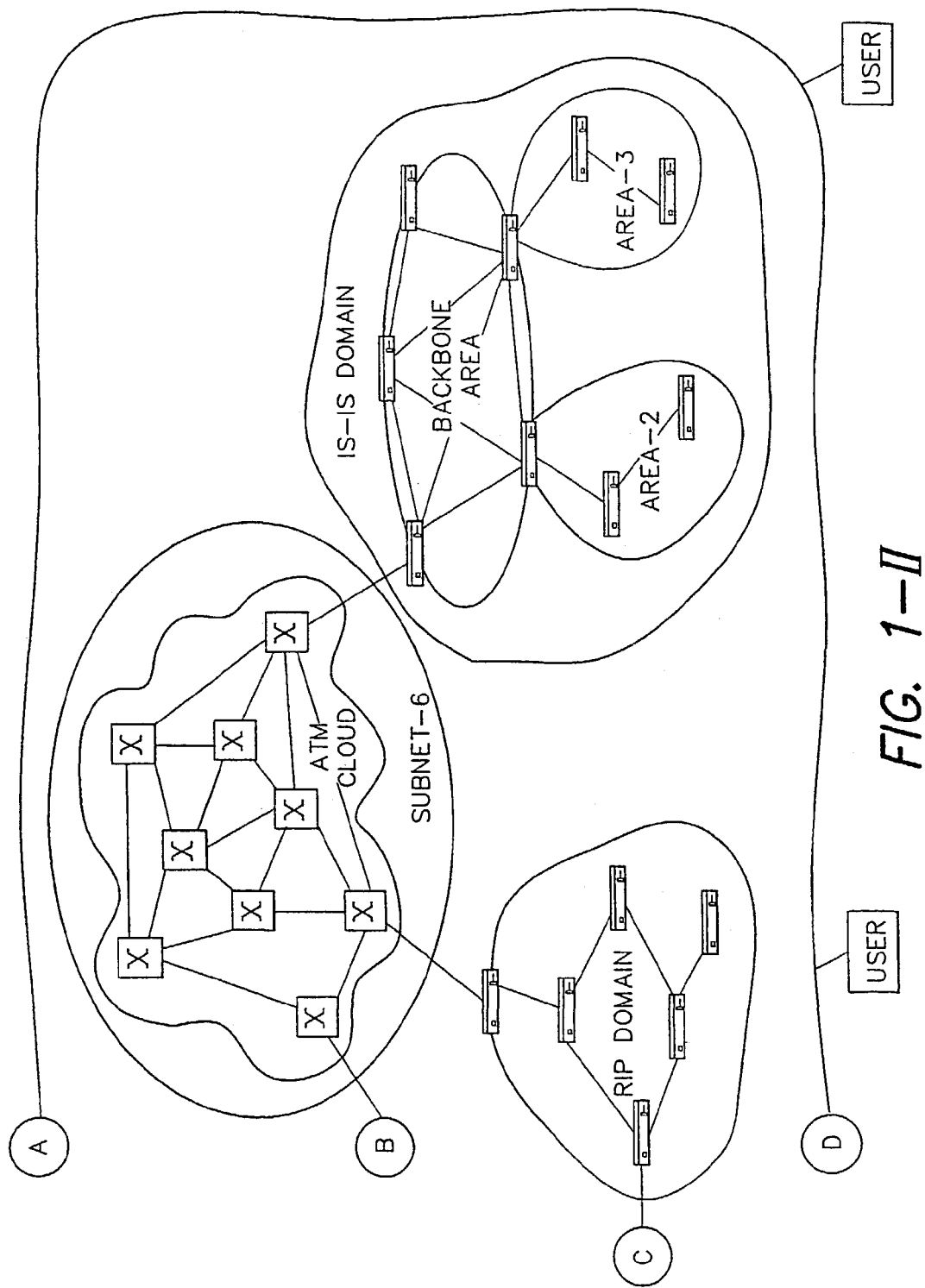
FIG. 1-II

SYSTEMS AND METHODS FOR DIAGNOSING FAULTS IN COMPUTER NETWORKS

This application claims priority from a U.S. Provisional Application No. 60/202,296, entitled "Construction of a Very Rich, Multi-layer Topological Model of a Computer Network for Purposes of Fault Diagnosis," filed on May 5, 2000, and claims priority from U.S. Provisional Application No. 60/202,299, entitled "A method for diagnosing faults in large multilayered environments guided by path and dependency analysis of the modeled system," filed on May 5, 2000, and claims priority from U.S. Provisional Application No. 60/202,298, filed on May 5, 2000, entitled "Method and apparatus for performing integrated computer network, system, and application fault management," all of which are incorporated by reference in their entireties.

GENERAL DESCRIPTION

The invention relates to detecting, diagnosing and managing faults in communications networks.

The construction of computer networks started on a large scale in the 1970's. Computer networks link personal computers, workstations, servers, storage devices, printers and other devices. Historically, wide area computer networks (WANs) have enabled communications across large geographic areas, and local area networks (LANs) communications at individual locations. Both WANs and LANs have enabled sharing of network applications such as electronic mail, file transfer, host access and shared databases. Furthermore, WANs and LANs have enabled efficient transfer of information, and sharing of resources, which in turn increased user productivity. Clearly, communications networks have become vitally important for businesses and individuals.

Communications networks usually transmit digital data in frames or packets created according to predefined protocols that define their format. Data frames include headers (located at the beginning and containing addresses), footers (located at the end of the frames), and data fields that include the transmitted data bits (payload). Data frames may have a fixed or variable length according to the used protocol or network type.

A communications network transmits data from one end station (i.e., a computer, workstation, server etc.) to another using a hierarchy of protocol layers (i.e., layers that are hierarchically stacked). In the communication process, each layer in the source communicates with the corresponding layer in the destination in accordance with a protocol defining the rules of communication. This is actually achieved by transferring information down from one layer to another across the layer stack, transmitting across a communication medium, and then transferring information back up the successive protocol layers on the other end. To facilitate better understanding, however, one can visualize a protocol layer communicating with its counterparts at the same layer level.

The open system interconnection (OSI) model has seven layers that define the rules for transferring information between the stations. A physical layer (Layer 1) is responsible for the transmission of bit streams across a particular physical transmission medium. This layer involves a connection between two endpoints allowing electrical signals to be exchanged between them.

A data link layer (Layer 2) is responsible for moving information across a particular link by packaging raw bits into logically structured packets or frames. Layer 2 ensures good transmission and correct delivery by checking errors, re-transmitting as necessary, and attaching appropriate addresses to the data sent across a physical medium. If a destination computer does not send an acknowledgment of frame receipt, Layer 2 resends the frame. The contention access methods (e.g., CSMA/CD, and Token Passing) are regarded as Layer 2 activities. Layer 2 may be further divided into two sub-layers: Logical Link Control (LLC) and Media Access Control (MAC). The MAC sublayer defines procedures the stations must follow to share the link and controls access to the transmission link in an orderly manner. The MAC sublayer defines a hardware or data link address called a MAC address. The MAC address is unique for each station so that multiple stations can share the same medium and still uniquely identify each other. The LLC sublayer manages communications between devices over a single link of the communications network.

A network layer (Layer 3) is set up to route data from one network user to another. Layer 3 is responsible for establishing, maintaining, and terminating the network connection between two users and for transferring data along that connection. Layer 3 addresses, messages, and determines the route along the network from the source to the destination computer. Layer 3 manages traffic, such as switching, routing, and controlling the congestion of data transmissions.

A transport layer (Layer 4) is responsible for providing data transfer between two users at an agreed level of quality. When a connection is established, this layer is responsible for selecting a particular quality of service (QoS), for monitoring transmissions to ensure the selected QoS, and for notifying the users if the QoS deteriorates. Layer 4 also provides for error recognition and recovery, repackaging of long messages into smaller frames of information, and acknowledgments of receipt.

A session layer (Layer 5) focuses on providing services used to organize communication and synchronize the dialog that takes place between users and to manage the data exchange. The primary concern of Layer 5 is controlling when users can send and receive concurrently or alternately. A presentation layer (Layer 6) is responsible for the presentation of information in a way that is meaningful to network users. This may include character code transmission, data conversion, or data compression and expansion.

Layer 6 translates data from both Layer 5 and from Layer 7 into an intermediate format and provides data encryption and compression services. Layer 7 is an application layer that provides means for application processes to access the system interconnection facilities in order to exchange information. This includes services used to establish and terminate the connections between users and to monitor and manage the systems being interconnected, as well as the various resources they employ.

As data is passed down through the layers, each layer may or may not add protocol information to the data, for example, by encapsulating frames with a header or removing the header, depending on the direction in the protocol stack. The individual protocols define the format of the headers.

MAC address includes a source address and a destination address, which have a predefined relationship to a network station. Higher network layers provide a network address that has a logical relationship established by a network administrator according to a predetermined network addressing arrangement. The assigned network address conveys information that can be used by a router when routing frames through the internetwork. If the network address is hierarchical, a router may use a portion of the address to route the packet to a higher-level partition or domain in the internetwork. Some protocols are hierarchical others are not so hierarchical routing may or may not be available.

The global network may be subdivided into IP networks, which in turn may be subdivided into subnets. An IP address includes a network number (assigned by IANA), a subnet number (assigned by a network administrator), and a host that identifies an end station. The host number may be assigned by a network administrator, or may be assigned dynamically. This is a form of hierarchical addressing that is used by IP routing algorithms to perform hierarchical or prefix routing operations. Routing algorithms maintain information of all higher-level routing environments in routing tables for domains by recording their shortest unique address prefixes.

A station may support more than one network layer protocol. Such station has multiple network addresses and multiple protocol stacks that present the same MAC address on a port for the different protocols. Thus, a multi-protocol stack station connected to both an IP and an IPX network includes an IP network address and an IPX network address.

A communications network may include a number of network entities (or nodes), a number of interconnecting links and communication devices. A network node is, for example, a personal computer, a network printer, file server or the like. An interconnecting link is, for example, an Ethernet, Token-Ring or other type network link. Communication devices include routers, switches, bridges or their equivalents. As computer networks have grown in size, network management systems that facilitate the management of network entities, communication links and communication devices have become necessary tools for a network administrator.

A bridge or a switch is a Layer 2 entity that is typically a computer with a plurality of ports for establishing connections to other entities. The bridging function includes receiving data from a port and transferring that data to other ports for receipt by other entities. A bridge moves data frames from one port to another using the end-station MAC address information contained in the switched frames. Switches interconnect the communication media to form small domains of stations, such as a subnetwork. Subnetworks or subnets provide an organizational overlay to an internetwork that facilitates transmission of data between the end stations, particularly for broadcast transmissions. The subnet functions to limit the proliferation of broadcast frames to stations within a broadcast domain.

A router is an intermediate station that interconnects domains or subnets by providing path from a node on a first network to a node on a second network. There are single protocol or multi-protocol routers, central or peripheral routers, and LAN or WAN routers. A peripheral router connects a network to a larger internetwork, and thus may be limited to a single protocol. A central router may be connected to a different board in a server or a hub and thus usually has a multi-protocol capability.

A router provides the path by first determining a route and then providing an initial connection for the path. A router executes network routing software that depends on the used protocol. A router can work with different data-link layer protocols and thus can connect networks using different architectures, for example, Ethernet to Token Ring to FDDI. Furthermore, there are routers of several levels, wherein, for example, a subnetwork router can communicate with a network router. Organizing a communications network into levels simplifies the routing tasks since a router needs to find only the level it must deal with. The use of different network levels is shown in FIG. 1.

In general, a global communications network connects devices separated by hundreds of kilometers. A LAN covers a limited area of maximum several kilometers in radius connecting devices in the same building or in a group of buildings. LANs usually include bridges or switches connecting several end-stations and a server. In a LAN, a bridge or a switch broadcasts traffic to all stations. Until a few years ago, a LAN was user-owned (did not run over leased lines) with gateways to public or other private networks. When a user moved or changed to an end-station at another location on the network, a network administrator had to rewire and reconfigure the user's station. This has changed with the introduction of virtual LANs.

A virtual LAN (VLAN) is a logical Layer 2 broadcast domain, which enables a logical segmentation of the network without changing the physical connections. A VLAN enabled switch segments the connected stations into logically defined groups. Broadcast traffic from a server or an end-stations in a particular VLAN is replicated only on those ports connected to end-stations belonging to that VLAN. The broadcast traffic is blocked from ports with no end-points belonging to that VLAN, creating a similar type of broadcast containment that routers provide. VLANs may also be defined between different domains connected by a router. In this case, the router passes network traffic from one domain to the other (as done without defining a VLAN), and passes network traffic from one VLAN to the other. The router also passes network traffic between VLANs that are in the same domain because VLANs do not normally share user information. The router is configured as a member of all VLANs.

The VLAN designation is assigned (e.g., programmed) to each internal port and is stored in a memory portion of the switch. Every time a message is received by a switch on an internal port, the VLAN designation of that port is associated with the message.

Virtual Private Networks (VPNs) have been designed to interconnect end-stations that are geographically dispersed. For example, owners of large communications networks can provide centralized management services to small and medium sized businesses. The provider can configure VPNs that interconnect various customer sites in geographically separate locations. These VPNs offer privacy and cost efficiency through sharing of network infrastructure. Various VPNs have been proposed with various degrees of security, privacy, scalability, ease of deployment and manageability.

A global communications network may use a different levels different routing and connection management protocols such as International Standards Organization (ISO) Open Systems Interface (OSI) Intermediate Systems to Intermediate Systems (IS-IS), and Internet Open Shortest Path First (OSPF) protocols are used for connectionless routing of data frames. Asynchronous Transfer Mode (ATM) Forum Private Network-Network-Interface (PNNI) protocol is used for connection oriented multi-media services. The routing protocols identify a network node using a global address of a Route Server Element (RSE). The RSEs generate routing that identify optimal routes for communication throughout the network. The RSE is responsible for administration of the algorithms that enable a node to keep its view of the network topology and performance metric current, referred to as Routing Information Exchange (RIE). Thus an RSE usually acts as a central element for the routing of traffic through the node.

In general, the use of WANs, LANs, VPNs, and VLANs has increased the number and complexity of communications networks. These networks continuously evolve and change due to growth and introduction of new interconnections, topologies, protocols, or applications. Furthermore, most networks have redundant communication paths to prevent portions of the network from being isolated due to link failures. Also, multiple paths can be used simultaneously to load-balance data between the paths. However, redundant paths can also introduce problems such as formation of loops. Furthermore, network performance can degrade due to improper network configurations, inefficient or incorrect routing, redundant network traffic or other problems. Network hardware and software systems may also contain design flaws that affect network performance or limit access by users to certain of the resources on the network. These factors make network management complex and difficult.

A network management process controls and optimizes the efficiency and productivity of a communications network. A network management station manages the network entities (e.g., routers bridges switches, servers, storage devices, computers, printers) using a network management protocol such as a Simple Network Management Protocol (SNMP), Internet Control Message Protocol (ICMP), or another network management protocol known in the art. Using a network management protocol, the network management station can deliver information or receive information by actively polling the network entities or by receiving unsolicited information from the network entities. Using SNMP, a network management station can executes a set, get, or get-next functions to set and retrieve information from a network entity. This information may be stored within the polled network entity as Management Information Base (MIB). The network management station can receive unsolicited information from a network entity in the form of an SNMP trap. Network entities may send SNMP traps to the network management station when a problem in the network or network entity occurs.

A network management station may be implemented using any general purpose computer system, which is programmable using a high-level computer programming language or using specially programmed, special purpose hardware. The hardware includes a processor executing an operating system providing a platform for computer programs that run scheduling, debugging, input-output control, accounting compilation, storage assignment, data management, memory management, and communication control and other services. The application programs are written in high level programming languages.

A network management station can include a network manager unit, a network communication interface, a data acquisition unit, a data correlation unit, and a graphical user interface. The data correlation unit interprets data received through the data acquisition unit and presents the interpreted data to a user on the graphical user interface. The network communication interface may include transport protocols and LAN drivers used to communicate information to the communications network. The transport protocols may be IPX, TCP/IP or other well-known transport protocols. The LAN drivers may include software required to transmit data on a communications network through the network interface. The LAN drivers are generally provided by the manufacturer of the network interface for a general purpose computer for the purpose of communicating through the network interface. The network manager unit may be an SNMP network manager/agent implementing SNMP functions, or another type of network manager unit performing associated management functions. The network manager unit utilizes the network communication interface to transfer requests to network entities over a communications network.

A network management station may use a network management agent residing on a network entity. The network management agent may be a software process running on a processor or may be special purpose hardware. The network management agent may be an SNMP agent (or ICMP agent?), which may include a data collection unit, a network manager unit, and a network communication interface for communication as described above. For example, this communication may use network management functions such as SNMP functions. Alternatively, a network management agent, residing on a network entity, may include a data correlation unit, a data collection unit, a network manager unit and a network communication interface for communication.

In the network management station, the data correlation unit interprets data received through data acquisition unit. The data correlation unit may include an interface processor, a state processor, a hierarchical database, and one or more sets of object rules. The interface processor communicates with graphic libraries residing in the graphical user interface to present interpreted data to a user. The interface processor performs graphic functions associated with objects related to a network map or model. The graphic functions generate visual notifications to a user. The state processor performs correlation functions of the data correlation unit by requesting and receiving network management information from the data acquisition unit. The data acquisition unit stores data and requests information from the network manager. In the network agent, the data correlation unit interprets data received by data collection unit. The state processor performs correlation functions of the data correlation unit by requesting and receiving network management information from the data collection unit. The data collection unit stores data and requests information from the network manager. In the network agent, the data collection unit can collect data from the network entity directly through its own network manager. The data collection and acquisition units can invoke network management commands within network manager libraries, which send and retrieve information from a network entity. These commands may be SNMP functions mentioned above, or ICMP functions. The state processor interprets data received from the network manager libraries in accordance with object rules. The object rules define how the state processor combines or parameterizes different properties of a network entity. The state processor can produce parameterized properties from the object rules.

Communications networks are becoming increasing complex, both physically and logically. It is no longer adequate for network management stations to merely report problems of unreachability. Network and application service providers need to maintain availability, while also ensuring optimal performance. Therefore, there is a need for providers to detect and analyze soft failures (like performance brown-outs) and failures before they affect service availability. Furthermore, there is a need to detect and diagnose loss of redundancy, denial of service attacks, inadvertent misconfigurations, and degradation of services.

SUMMARY OF THE INVENTION

The present invention is directed to a system, a method and a product (which can be stored in a computer-readable storage medium) for detecting, diagnosing or managing faults in communications networks. In our description we define a fault as a complete or partial failure, service disruption or deterioration of service quality. For example, network fault conditions includes no-access faults, slow access (bottlenecks), redundancy loss, network blasters (i.e., entities emitting excessive amounts of traffic), obstacles (e.g., when one entity prevents another entity from achieving maximum throughput), stale or misplaced static routing information, incorrect network policies, packet filtering or ACL misplacement, or denial of service attacks.

According to one aspect, a method and system for diagnosing a fault in a communications network including a fault object factory, a path determination module, and a fault diagnosis engine. The fault object factory is constructed and arranged to receive fault data and create fault objects. The path determination module is constructed to determine, in a communications network, a path related to the fault data. The fault diagnosis engine is constructed to perform, using the determined path, a fault analysis on the fault data to diagnose a fault related to the communications network.

Preferred embodiments of this aspect include one or more of the following features: The system may include a fault detector constructed and arranged to detect a fault in a monitored entity. The system may include a fault repository constructed and arranged for storing and accessing fault objects. The system may include a fault handler constructed to perform analysis of the fault object. The fault handler includes a fault handler tester. The fault handler includes a diagnoser fault handler constructed and arranged to change a fault state of the fault object. The fault repository includes a fault object and a fault association object. The fault object includes a description, a processing state, and test result object. The test result object includes a description, a target entity, test data, and a result state.

According to another aspect, a network management system includes a fault diagnosis system connectable to a communications network. The fault diagnosis system includes a fault object factory, a path determination module, and a fault diagnosis engine. The fault object factory is constructed and arranged to receive fault data and create fault objects. The path determination module is constructed to determine, in a communications network, a path related to the fault data. The fault diagnosis engine is constructed to perform, using the determined path, a fault analysis on the fault data to diagnose a fault related to the communications network.

The network management may also include a help desk system, a topology mapper or an impact analyzer.

According to yet another aspect, a method and system for diagnosing a fault in a communications network including means for receiving fault data; means for determining path in the communications network related to the fault data; and means for performing a fault analysis, using the determined path, on the fault data to diagnose a fault related to the communications network.

Preferred embodiments of this aspect include one or more of the following features: Means for performing the fault analysis may include means for performing a root cause analysis. Means for determining path includes means for performing a domain-specific algorithm. The path determination includes dynamically generating a trace route by employing a path-tracing algorithm. Means for determining path includes means for employing data stored in a topology mapper. Means for determining path includes using means for routing and switching algorithms used by the network for data forwarding. Means for determining path includes means for performing a layer 3 path determination, which may include finding a router in a subnet and using the router as a starting point for path generation.

Means for receiving fault data may include creating a fault object in a fault object factory using the fault data. The system may use a detector (e.g., an agent) for registering fault data and providing the fault data for analysis. Means for performing root cause analysis may include means for triggering a specific fault handler such as a diagnoser fault handler or a tester fault handler. The diagnoser fault handler may be designed to handle QoS problems. The diagnoser fault handler may be designed to handle problems in virtual private networks. The diagnoser fault handler may be designed to handle problems in multi-cast groups. The diagnoser fault handler may be designed to handle wireless connectivity problems. The diagnoser fault handler may be designed to handle problems related to cable access or DSL access. The diagnoser fault handler may be designed to "know" about components of a particular network layer and rely on diagnosis capabilities of their constituent subcomponents to examiner deeper through the layers.

According to yet another aspect, when modeling the communications network, the system generates source to destination paths by following the standards-based routing and forwarding algorithms employed by the network devices. Then, by examining the actual application dependencies and the network elements in the path, the system efficiently diagnoses various problems thereby minimizing the burden on an already degraded network environment. Additionally, the combination of application dependencies and path analysis allows the system to generate the impact of network degradation. Based on the accessibility of these applications, users can be informed about important problems. Furthermore, the network management system can intelligently adjust its monitoring of the degraded section of the network until the problem is remedied. Finally, the system can use path analysis as a tool to verify that problems have been fixed.

The present system provides a collection of autonomous or integrated network fault detectors and service disruption detectors that report symptoms of network faults. Based on the reported symptoms, a fault object factory creates fault objects in a shared fault repository. A fault diagnosis engine (which is a generic fault-processing engine) triggers fault handlers that include fault testers and fault diagnosers. The fault diagnosers are registered for notification of faults of a specific type entering a specific state. Fault diagnosers use the rich topology model of the network and services, efficient data path determination, and innovative analysis techniques to find related faults. By finding and analyzing related faults, the system ultimately finds the root cause fault. The fault diagnosers may also detect new related or unrelated faults and the fault object factory then creates new fault objects for the fault repository. Using the fault objects the system constructs a fault causality tree. As a result, the root cause fault is diagnosed and the impact of the fault is determined.

BRIEF DESCRIPTION OF THE DRAWINGS

FIG. 1 shows diagrammatically several network management modules connectable to a communications network.

DESCRIPTION OF PREFERRED EMBODIMENTS

Figure 2:
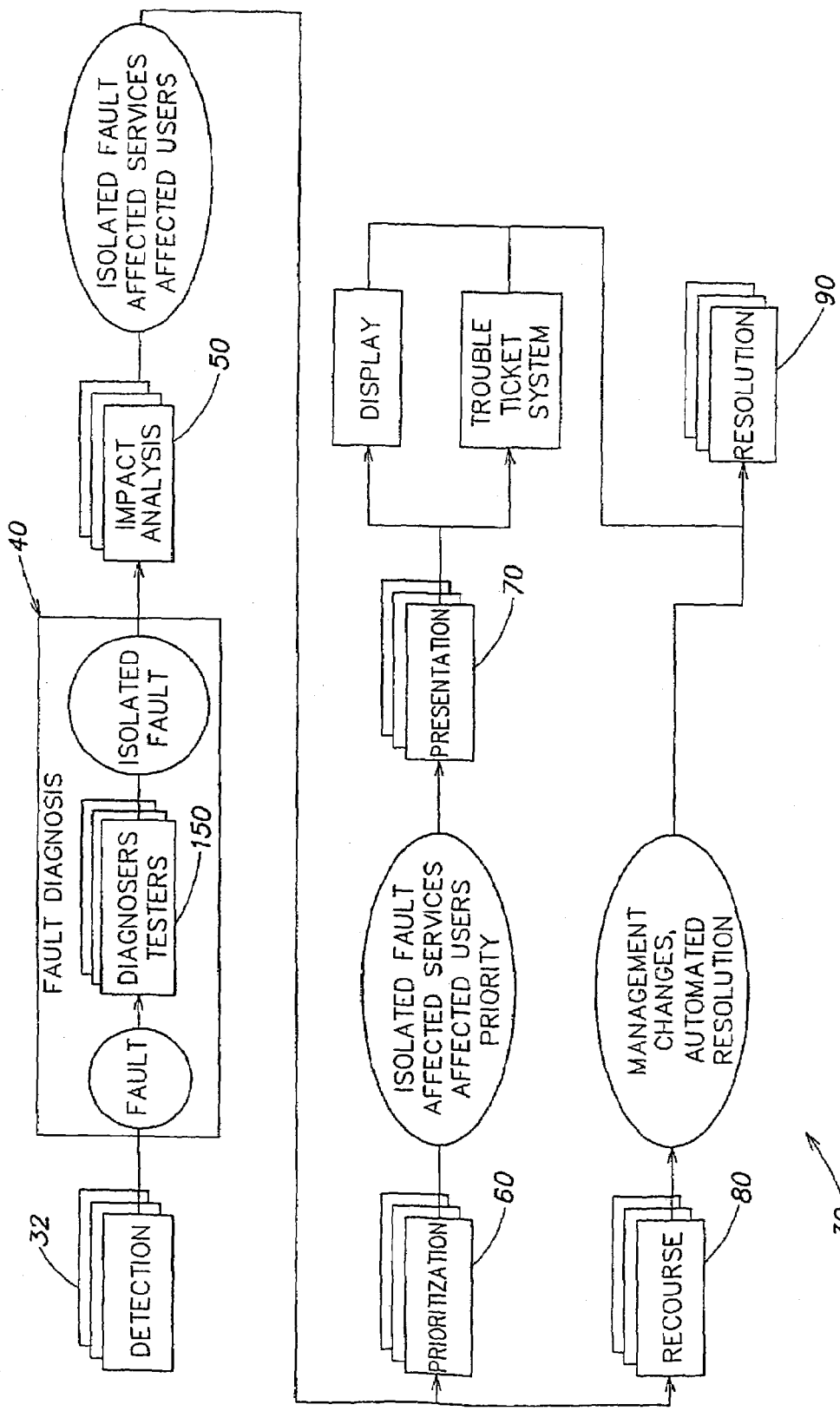
FIGS. 2 and 2A are block diagrams of a fault management and diagnosis process.

FIG. 1 shows diagrammatically a network management system 10 including a fault diagnosis system 12, a topology mapper 14, an impact analyzer 16 and a help desk system 18. The network management system communicates with a communications network 20 (or application service). The network includes a set of interconnected network elements such as routers, bridges, switches, and repeaters. These network elements provide transportation of data between end stations. Furthermore, there are computers known as servers that provide services such as e-mail, accounting software, sales tools, etc. Typically, data is transmitted electronically or optically, and network elements can forward data in packets, frames or cells to the intended destination. Servers include network adapters and/or software that interpret the electronic or optical data packet into the data elements and pass these elements to the appropriate application being hosted.

The network management system 10 includes a commercially available processor (for example, Pentium microprocessor manufactured by Intel Corporation) executing an operating system providing an operating environment for a network management program. The processor and the operating system provide a computer platform for which application programs are written in higher level programming languages. The computer (or application host) interfaces with permanent data storage, such as a magnetic or optical disk drive, a disk array, non-volatile RAM disk, or a storage area network, which maintain data files such as user configurations and policies. In general, the network management program may be configured as a generic software application residing in any commercially available computing platform.

Preferably, fault diagnosis system 12, topology mapper 14, and help desk system 18 are software applications written in Java and running on any computer with a Java Runtime Environment (JRE). For example, a Dell laptop computer with an Intel Pentium processor running the Windows 2000 operating system, or a Sun Ultra 60 computer running Solaris v. 2.7. Alternately, fault diagnosis system 12, topology mapper 14, and help desk system 18 are developed in any object oriented or structured programming language, and compiled for execution on any one or many computer platforms, or could be implemented on a neural network computing device.

The computer has a network adaptor that provides communication (preferably, but not necessarily, IP) to the users on the network. The fault diagnosis engine application may share a host with help desk system, and/or the topology mapper, or each can run on a separate host, in which case they communicate using a network adaptor. Topology mapper 14 determines the network topology and creates a model. The permanent data storage holds data files that describe the current network topology, and configuration files that control the performance of topology mapper 14. A user is an end station, interfaced to access the network or services, used by a person who is using the network, or is using services provided by the network.

The network management system 10 performs a fault management process 30 shown in FIG. 2. The entire process is part of a phased, componentized, but interconnected method, wherein all aspects of fault management are performed. The fault management process of FIG. 2 includes the following seven phases: fault detection 32, diagnosis 40, impact analysis 50, prioritization 60 presentation 70, recourse 80, and resolution 90.

Fault detection process 32 (performed by fault detectors 130 shown in FIG. 3) is the most basic part of the fault management system. Fault detectors 130 detect raw fault data. Fault detectors 130 receive information by SNMP polling, SNMP trap handling, performance monitoring, historical trend analysis, device configuration monitoring, application and system-level management tools, and help desk trouble tickets. Fault detection process 32 can also add information to the raw fault data enabling improved diagnosis of the fault. The fault data are assembled into fault objects.

Fault diagnosis 40 occurs after a "detected" fault is entered into the system. A fault detection and management system 100 processes and correlates detected faults with other faults to determine their relationship. Fault detection system 100 finds one or more "root cause" faults and isolates these faults. Furthermore, the system can optionally suppress other symptomatic faults that were "caused" by the root cause faults. Fault diagnosis 40 can be performed in a single step or can involve many techniques such as examining device neighbor knowledge, tracing the route of management data, examining route tables and ACLs, etc.

Figure 3:
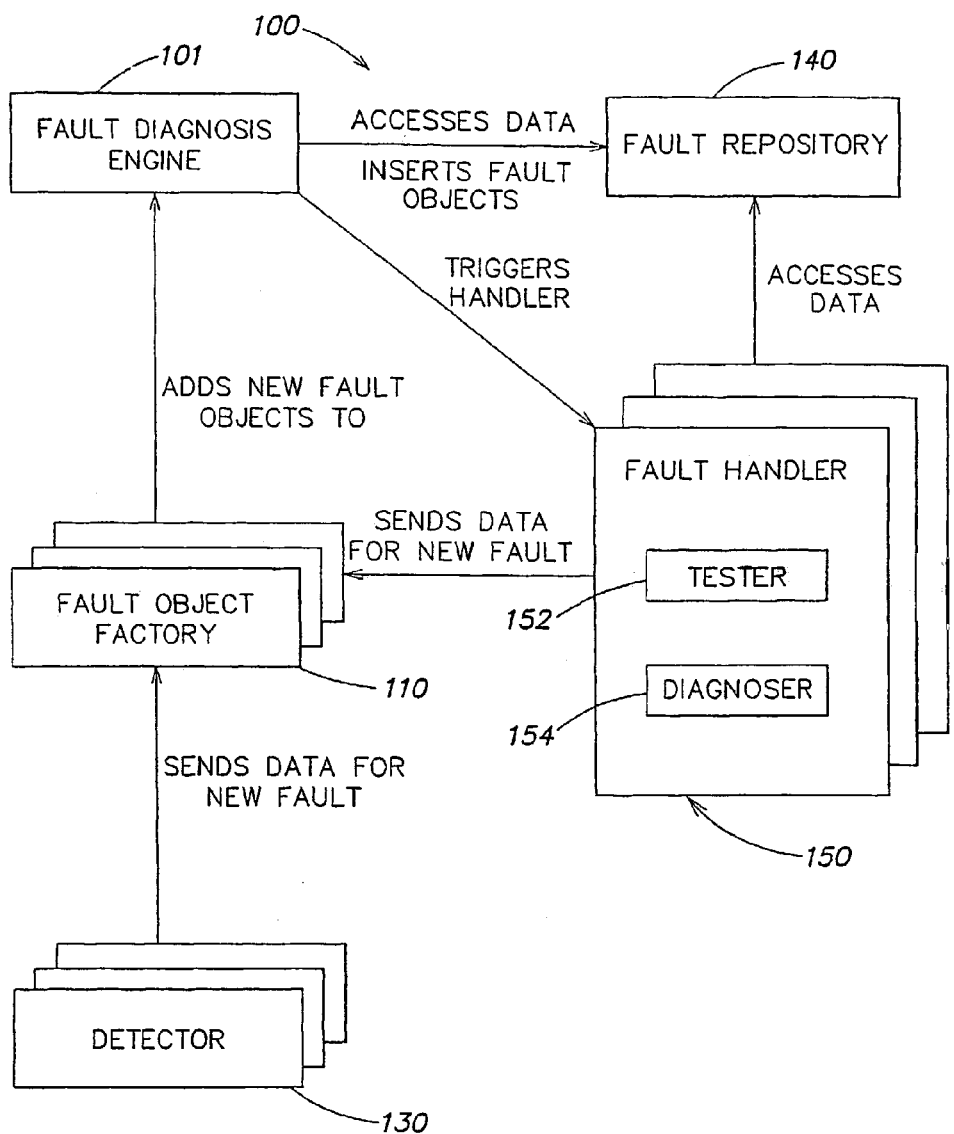
FIG. 3 is a block diagram of modules employed in a fault management and diagnosis system.

Fault impact analysis 50 determines the "scope" of the analyzed fault. After receiving a root cause fault determined, by fault diagnosis 40, impact analysis 50 determines the consequences of this fault. This determination includes analyzing the network services affected by the fault, the users affected by the fault, and any other ramifications the fault has on network 20, or the application being managed. Furthermore, impact analysis 50 may involve analyzing various logical layers that exist in a communication network and correlating a fault with its possible consequences at each layer. Impact analysis 50 may use a fault causality tree located in a fault repository 140 (FIG. 3). The interpretation schemes include analyzing how a network fault affects services like web servers or e-mail, examining how a misconfigured router running OSPF affects the users in each area, etc.

The network management system may also perform fault prioritization 60. After a fault has been diagnosed and its impact analyzed, the fault may be prioritized. Fault prioritization 60 assigns a priority/severity to each fault object and this is used to determine the proper presentation of the fault to a user. Fault prioritization process 60 may include multiple methods based on the type and scope of the fault such as examination of service level agreements and how the fault violates them, mission critical device analysis, and fault scope.

The network management system may also perform fault presentation 70. Fault presentation 70 provides the mechanism by which the system alerts a user that a fault has occurred. Fault presentation process 70 presents all information about the fault in a user-friendly manner. Fault presentation 70 may include steps and processes the systems used to diagnose the fault, thus allowing a user to verify the diagnosis and "trust" the system to accurately diagnose faults. Fault presentation 70 may also include a network monitoring alarm system.

The network management system may also include fault recourse 80. Fault recourse 80 provides a way in which a user can change the network management based on a given fault. For example, fault recourse 80 may involve reducing or stopping polling of devices downstream from a fault, reconfiguring connectivity modeling, script invocation to fix a misconfigured static route, or configuring user groups for a different email server.

The network management system may also include fault resolution 90. After presenting a fault to a user and fixing the problem, problem resolution 90 records the process for future fault detection and diagnosis. Fault resolution 90 can automatically trigger for any single resolved fault a re-evaluation of associated faults in the system. This re-evaluation proactively assesses the full scope of a resolved fault. If an associated fault is still not resolved, diagnosis can be re-started to determine the cause. This process is facilitated by the use of the fault causality tree created as a result of fault diagnosis process 40.

Figure 2A:
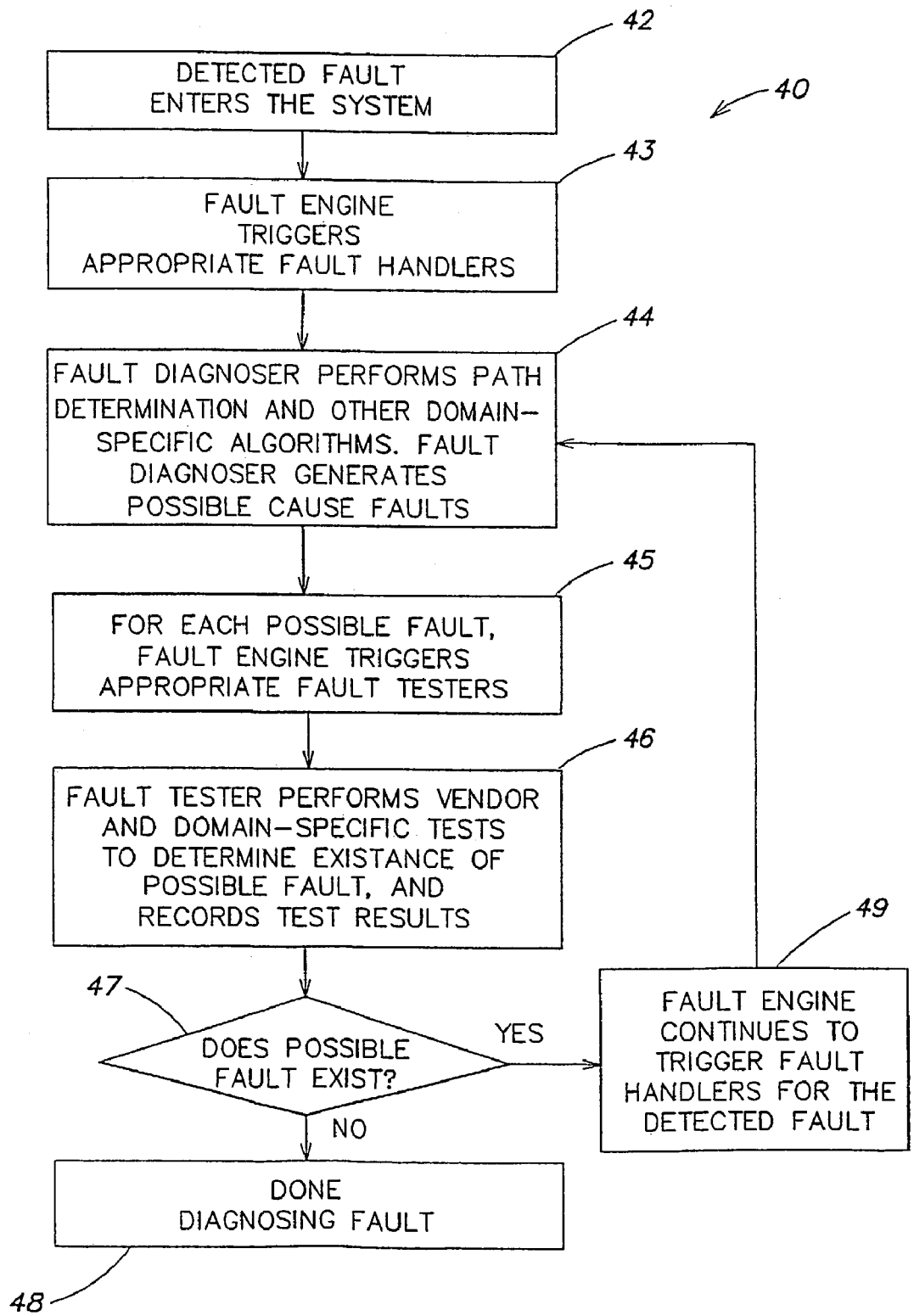

FIG. 2A shows diagrammatically in detail fault diagnosis process 40. A detected fault enters the fault detection and management system and a fault object is created (step 42). The fault diagnosis engine triggers appropriate fault handlers (step 43). A diagnoser fault handler performs path determination algorithms and domain specific algorithms as described in connection with FIGS. 6A through 6F. Then, the diagnoser fault handler generates possible faults that may be causes of the entered fault (step 44). For each generated, possible fault, the fault diagnosis engine triggers appropriate tester fault handlers (step 45). Each tester fault handler performs vendor-specific and domain-specific tests to determine the existence of one or several possible faults. Next, the tester fault handler records test results (step 46). If possible additional faults exist, the fault diagnosis engine continues to trigger tester fault handlers and diagnoser fault handlers (step 49). If there are no other possible faults, the fault diagnosis engine has isolated the fault and the system proceeds to impact analysis 50.

FIG. 3 shows fault diagnosis system 100, which includes five main parts: a fault diagnosis engine 101, a fault object factory 110, fault detectors 130, a fault repository 140, and handlers 150. Fault detection and management system 100 (or fault diagnosis system) has the ability to receive detected fault information from multiple sources, control the management of the faults, and produce a root cause analysis. Furthermore, the system also provides a mechanism for performing fault correlation and impact analysis. The impact assessment is not limited to the impact of the communications network, but may include disruptions in services or applications that depend on the network infrastructure.

Figure 3C:
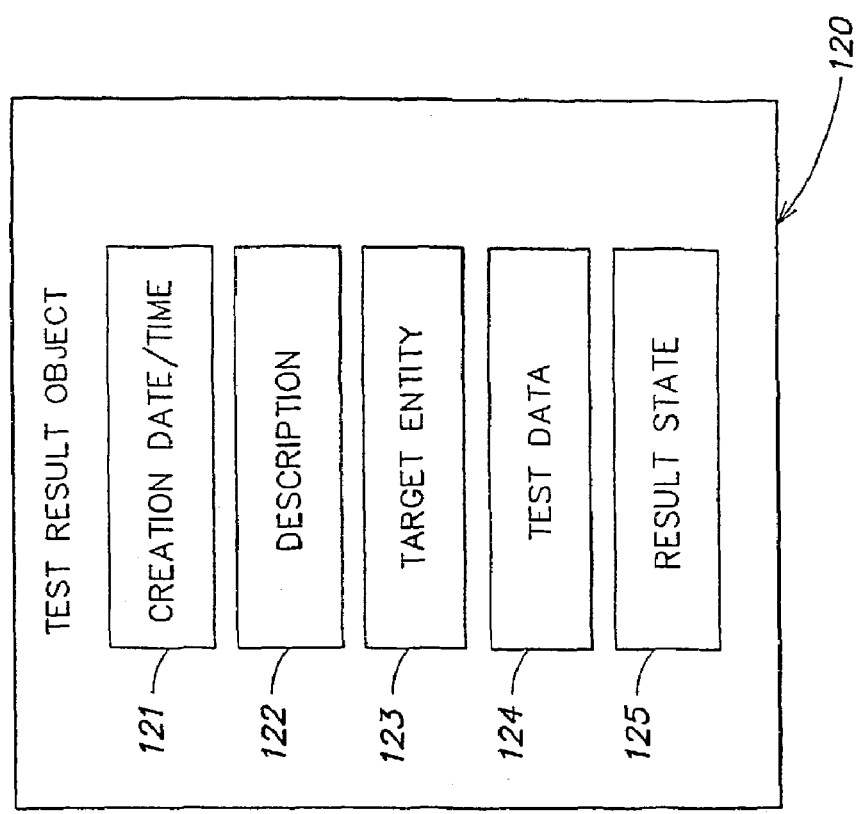
FIGS. 3A and 3C are block diagrams of objects employed in the fault management and diagnosis system of FIG. 3.
Figure 3A:
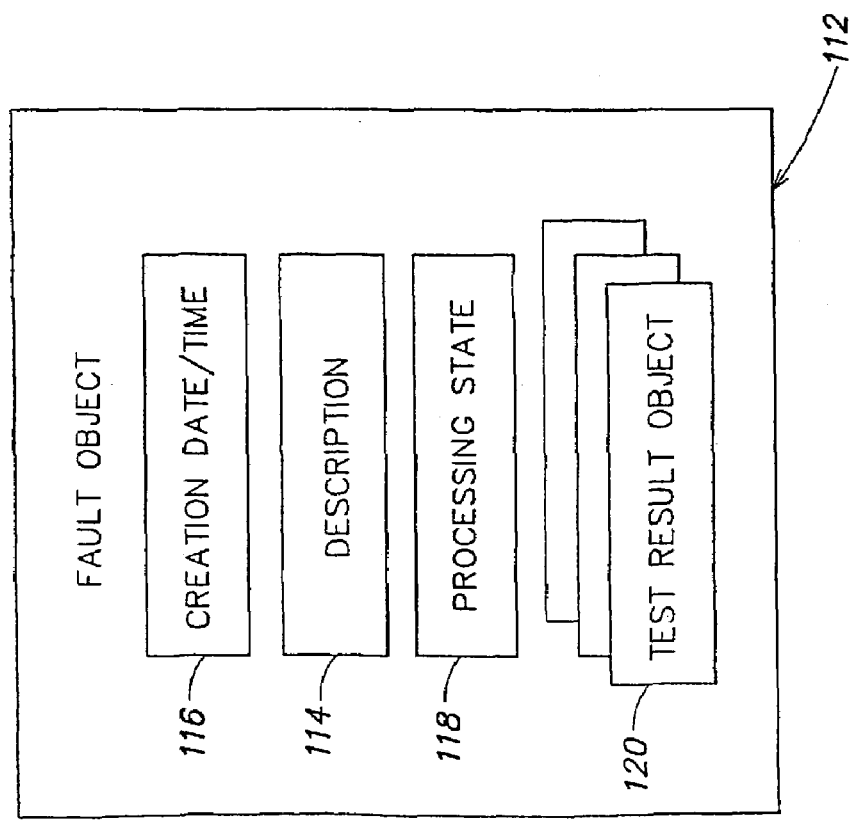

Fault object factory 110 receives data from fault detectors 130 and creates fault objects 112 shown in FIG. 3A. Each fault object 112 is associated with a fault type and there may be many fault types. Furthermore, each instance is a separate occurrence of a problem, potential problem, or condition of a communication network or an element located in the communication network (such as a misconfiguration, a degradation of service, physical failure or other).

Referring to FIG. 3A, the entire architecture of the fault detection and management system based on fault objects 112, which are records representing a detected problem, a potential problem, or a condition. Fault object 112 includes information about a detected fault, that is, includes a description of the problem or condition stored in field 114, time and date of the reported problem 116, a fault processing state 118, and one or more test result objects 120. The fault structure includes a context that is a mechanism for sharing varying amounts of data related to the fault; these amounts may exist between each instantiation of a type of fault.

Referring to FIG. 3, fault detector 130 detects a problem or potential problem on an entity in a managed system. Fault detector 130 provides a record of the condition to fault object factory 110, which generates fault object 112. Fault detector 130 can monitor an entity or receive unsolicited notification from an entity when a problem occurs, according to different methods known in the art. Fault detector 130 may perform a test and may provide to fault object factory 110 data with the results of the performed tests. Fault detector 130 may share a host with fault diagnosis engine 101, or may reside externally as an agent.

Figure 3B:
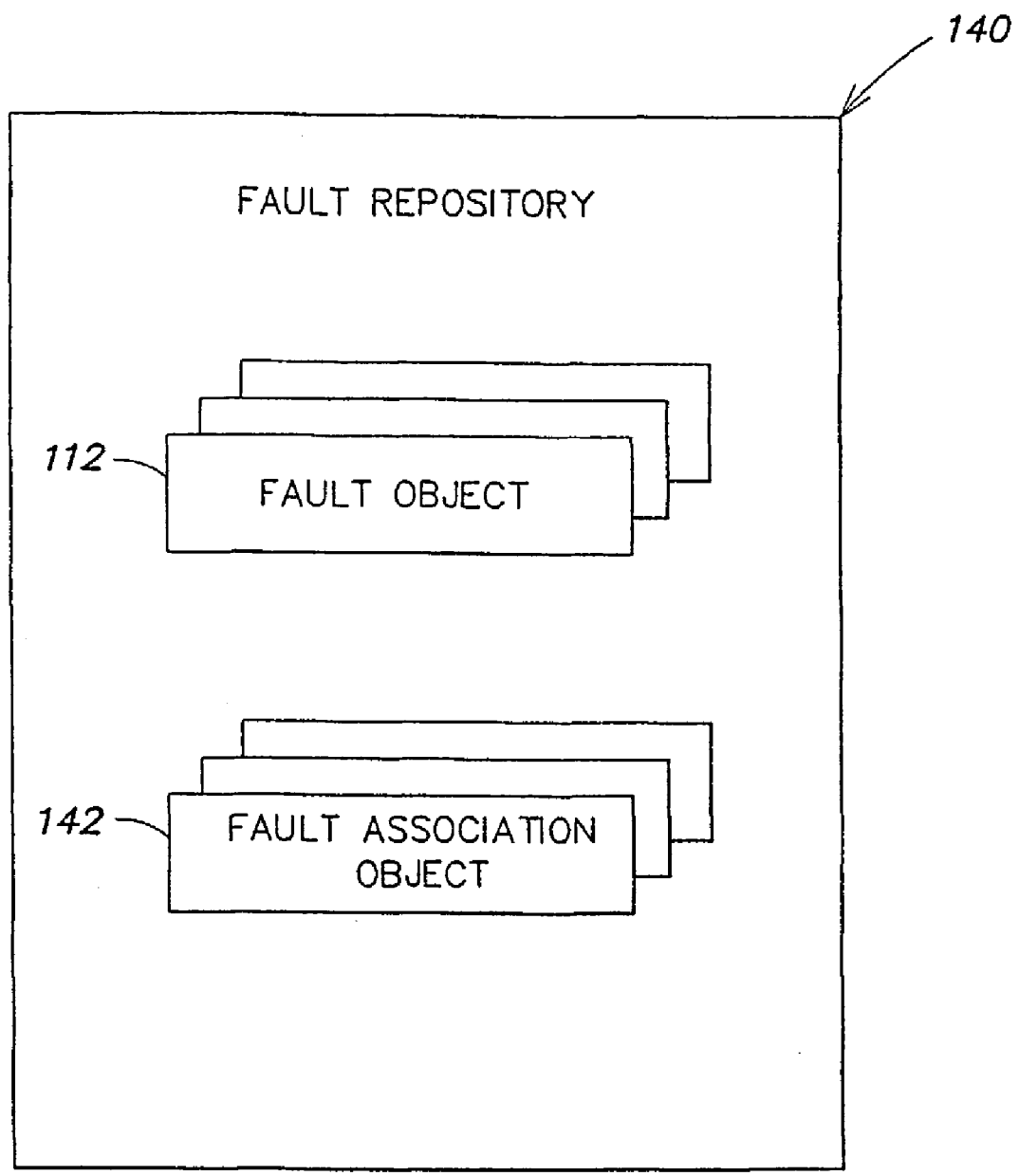
FIG. 3B is a block diagram of a fault repository module employed in the fault management and diagnosis system of FIG. 3.

Referring to FIG. 3B, fault repository 140 is the component used by a fault detection and management system 100 to store and access fault information. fault repository 140 stores every fault object 112 present in the system. Each component of the system (detection, diagnosis, etc.) can enter new fault objects into fault repository 140 and access any fault object 112. Preferably, fault repository 140 includes a table structure with services capable of searching and locating existing faults.

Fault repository 140 also includes fault associations 142, which provides a mechanism for relating faults to one another. Specifically, each defined fault association relates two fault objects. One fault object is on the left side of the association, and the other fault object is on the right side as shown for fault trees below. The semantics of an association are defined by the type of the association. New fault association types can be defined and added to the system, preferably using Interface Description Language (IDL) definitions of an interface for a service that uses the Common Object Request Broker Architecture (CORBA) transport protocol.

Figure 5:
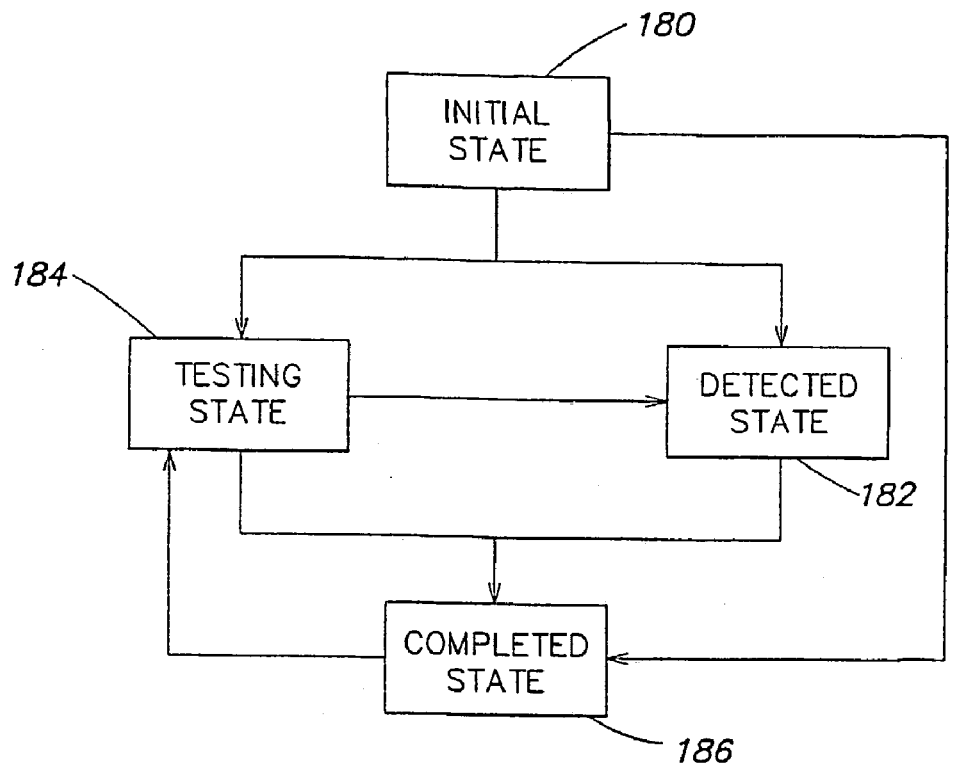
FIGS. 5 and 5A are a block diagrams depicting processing states of a fault during fault diagnosis performed by a fault management and diagnosis system.

Referring again to FIG. 3, each fault handler 150 performs a designated type of work as a result of a fault object entering a certain processing state (shown in FIG. 5). Fault handlers 150 may exist internal to the system, or reside externally in a separate process. Fault handlers 150 are registered for a particular fault type and state and, as part of the registration process, each fault handler 150 has an integer priority value. Then, fault handlers 150 are sorted by their priority values so that a fault handler with the lowest priority value is triggered first and subsequent handlers are triggered in sequence, as described below. One type of fault handler 150 can test a fault object and create a test result record. Furthermore, fault handler 150 may create additional types of fault objects, create associations between fault objects, correlate fault objects that indicate a similar problem, or perform impact analysis on a fault object to determine the scope of a problem. A tester fault handler 152 performs a selected test on a fault. A diagnoser fault handler 154 receives notification when a particular type of a fault enters a state. Diagnoser fault handler 154 may change the fault state (FIG. 5) and may associate the fault with other potential faults.

Fault diagnosis engine 101 is the central component of fault detection and management system 100 since it drives the management and diagnosis of faults. Fault diagnosis engine 101 provides a generic mechanism for fault handlers 150 to register for changes in the processing state of faults of a given fault type. Fault diagnosis engine 101 may employ any mechanism to specify registrations. The preferred implementation of fault diagnosis engine 101 uses XML (Extensible Markup Language) technology.

Figure 4:
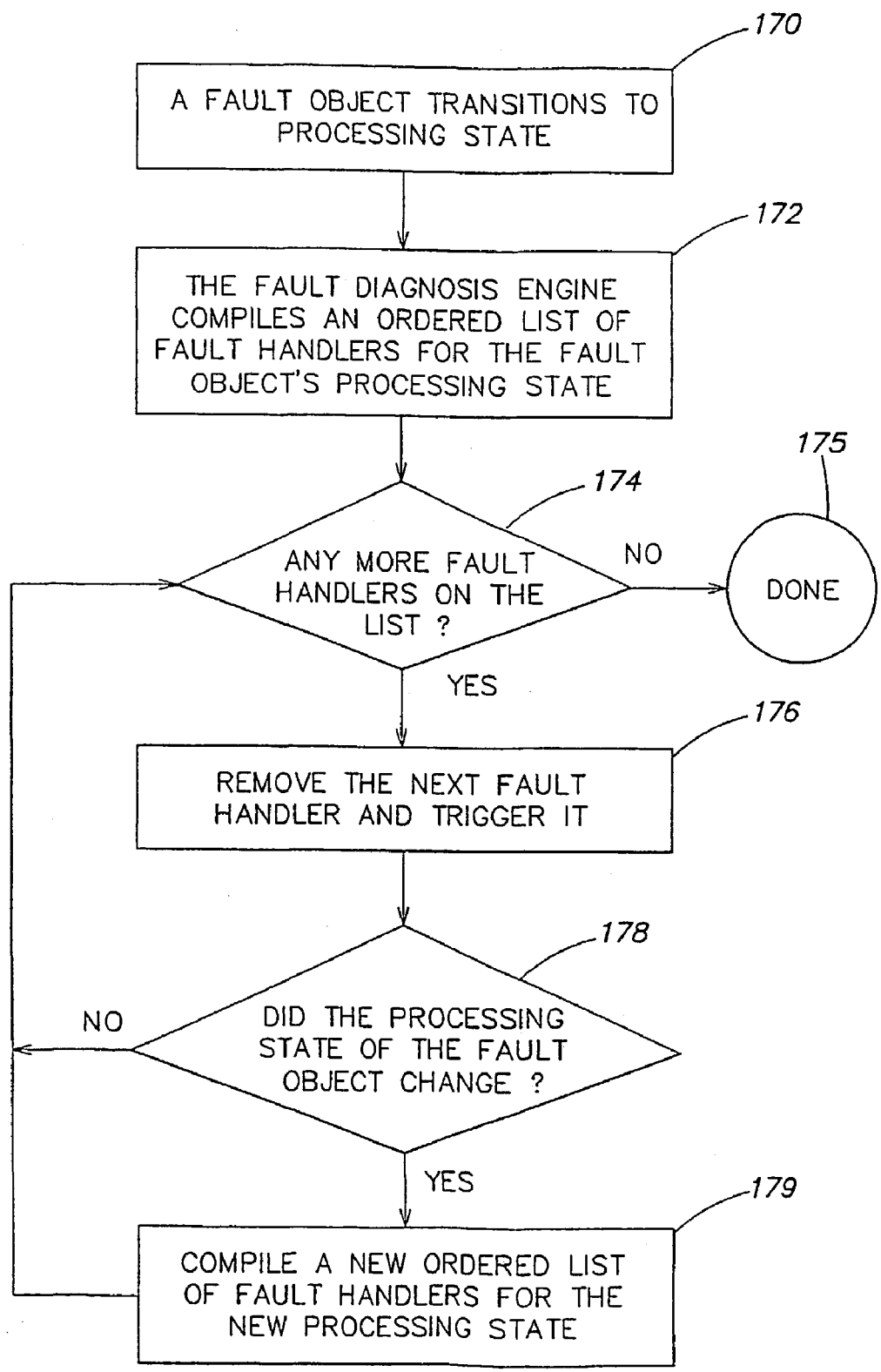
FIG. 4 is a flow diagram that illustrates a triggering mechanism for fault handlers by a fault diagnosis engine shown in FIG. 3.

Referring to FIG. 4, when a fault transitions to a state for which a handler has registered, the engine triggers the handler to perform its work. Fault diagnosis engine 101 can trigger one of fault handlers 150 arbitrarily or may use some triggering mechanism. Preferably, fault diagnosis engine 101 uses a priority mechanism to order the triggering of fault handlers that are sorted by their priority value (by triggering first a fault handler with the lowest value).

Figure 5A:
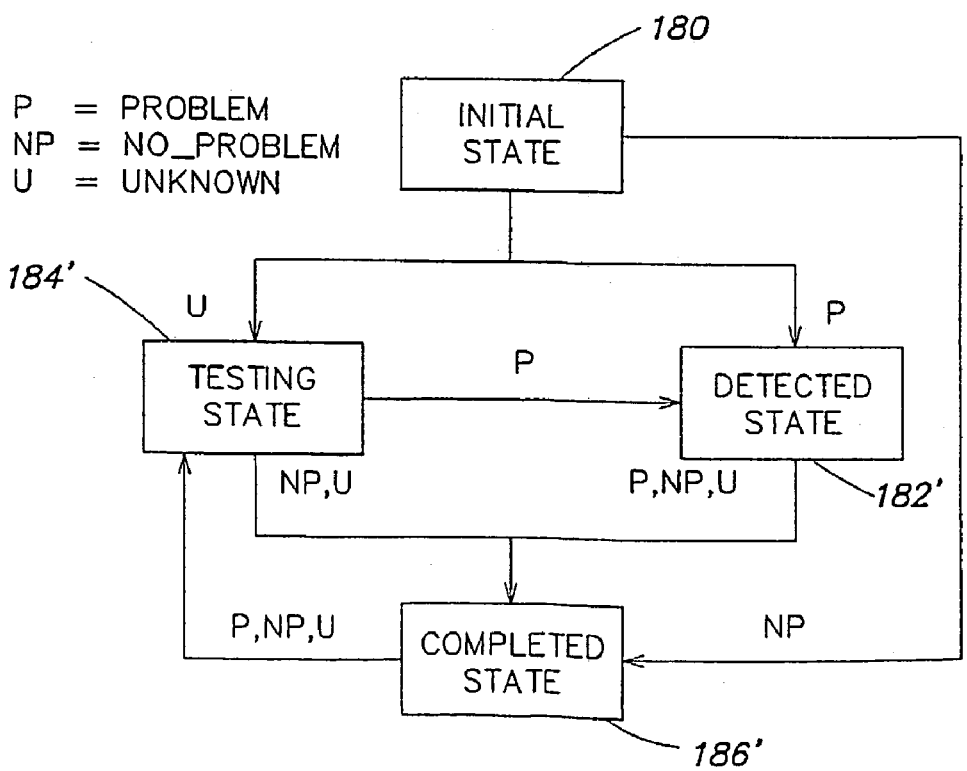

Fault detection and management system 100 uses fault processing states for analyzing faults. A fault's processing state represents its status in the fault management process and provides a mechanism to control the management of the fault. A fault can have a large number of possible states, and a fault can transition from state to state using different ways, as shown in FIGS. 5 and 5A. Preferably, the system utilizes a fault type hierarchy in which generic base fault types are defined and from which, new more specific fault types can be derived. Each fault, which exists in the system, is of some pre-defined fault type.

Referring to FIG. 3C, a test result object 120 includes a record of test results that were performed to determine the existence of the problem or condition for which the fault was created. Test result object 120 includes a textual description of the test (field 122), data obtained from the target of the fault (field 123), test data (field 124), any thresholds and parameters used in determining the test result (field 125). Test result record 125 also contains a state representing the status of the test.

While performing its work on a fault object, a fault handler may cause the processing state of the fault to be changed. In this case, no other handlers for the current state are triggered. Fault diagnosis engine 101 obtains the handlers for the new state and resumes triggering with the new handlers when the current handler completes its work.

FIG. 4 illustrates the triggering mechanism using a flow diagram. Fault diagnosis engine 101 provides a triggering mechanism and allows the fault handlers to control and manage the diagnosis process. The fault handlers are responsible for transitioning faults between processing states, determining causality and performing resolution and/or re-evaluation of faults.

Referring to FIG. 5, fault diagnosis engine 101 utilizes processing states of a fault to control the flow of diagnosis for that fault. As described above, fault handlers 150 are triggered for a fault based on the current processing state. The transition diagram of FIG. 5 defines the following processing states: An initial state 180 begins the life-cycle of a fault object. A detected state 182 indicates that an external fault detector 130 or an internal handler 150 positively determined the condition (that the fault represents) as a problem. A testing state 184 indicates the fault is unverified; that is, a condition that the fault represents requires testing to determine if it is a problem. A completed state 184 indicates that fault diagnosis has completed for the fault.

Fault diagnosis engine 101 may allow fault handlers 150 to directly transition a fault between states, wherein preferably the processing state is hidden from fault handlers 150. The engine transitions a fault's processing state based on the state of the current result of the fault as provided by the handlers. There are the following three test result states (shown in FIG. 5A): PROBLEM indicates a test has identified the fault to be a problem; NO_PROBLEM indicates a test has verified the condition that the fault represents does not or no longer exists; and UNKNOWN indicates a test could not be completed for some reason or the condition that the fault represents requires verification.

FIG. 5A illustrates transition of the processing states (shown in FIG. 5) based on test results of an analyzed fault. For example, fault diagnosis engine 101 triggers tester fault handler 152 (FIG. 3) for testing state 182 and fault handler diagnoser 154 for detected state 182. Furthermore, fault handler diagnoser 154 may also be triggered for testing state 184 if there are no tester fault handlers that can perform a direct test. There may also be fault handlers for completed state 184, which would not perform diagnosis, but would perform other tasks such as correlating faults that share a common root cause (described below) or notifying a presentation system to display the diagnosis results when performing presentation process 70.

Fault diagnosis engine 101 may employ further rules that govern the triggering of fault handlers when there are multiple handlers (or types of handlers) for a particular processing state. If there are multiple types of handlers, the engine may impose an ordering such that all handlers of one type are triggered before any handlers of another type.

Furthermore, if a handler provides a concrete result, as defined by the various result states, the engine may suppress remaining handlers of that type from being triggered and/or may suppress handlers of other types.

According to the preferred embodiment, since there may be both tester fault handlers 152 and diagnoser fault handlers 154 registered for testing state 184, fault diagnosis engine 101 imposes a rule that all tester fault handlers are triggered before any diagnoser fault handler. This is because a tester fault handles can directly determine the existence or non-existence of a problem, but a diagnoser fault handler cannot. In addition, if a tester fault handlers or diagnoser fault handler provides a concrete result, then fault diagnosis engine 101 suppresses remaining handlers for the current processing state. A concrete result is one whose state is either PROBLEM or NO_PROBLEM. A result state of UNKNOWN is not concrete, that is a result could not be positively determined, as shown in FIG. 5A.

To perform automated network fault analysis, fault detection and management system 100 utilizes different types of network domain fault handlers that are responsible for handling faults in a particular network domain. The network domain fault handlers include fault testers 152 and fault diagnosers 154 (generically described above). Each network domain fault diagnoser understands the model of its domain and is designed to determine possible causes of a network problem. Preferably, the system uses a specific type of network domain fault diagnoser that performs path determination in the communications network. Then, the determined path elements are combined with the possible problems, tested and analyzed to determine the possible causes of the detected fault.

Topology mapper 14 (or another topology source) provides a network topology including the location of key services (such as e-mail, DNS, web-server, etc.). The system uses the network topology to dynamically generate a thorough trace route using a path-tracing algorithm. The path-tracing algorithm is based on the actual routing and switching algorithms used by the network itself for data forwarding. (The algorithms are published in public standard documents including draft proposals—from IETF, IEEE, ATM Forum, and others.) Therefore the same routing and forwarding decisions that each device makes, in sending packets along the path from the source to the destination, are simulated to create the path used for fault analysis. Since the network is modeled, both physically and logically (Autonomous Systems, OSPF Areas, ATM clouds, VLANs, etc.), network traversal is as efficient as the network itself.

Figure 6:
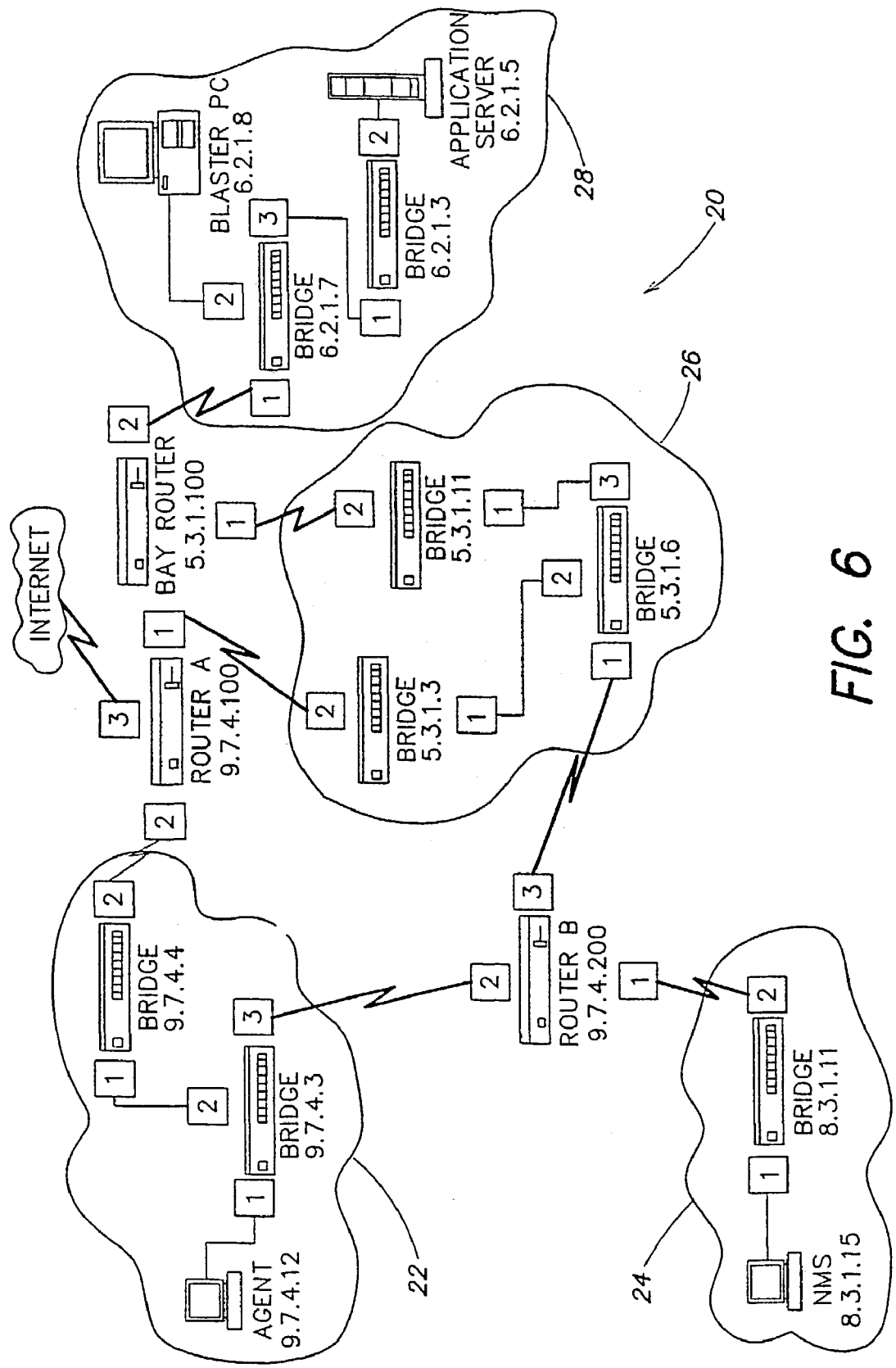
FIG. 6 illustrates a portion of the communications network shown in FIG. 1.

Referring to FIG. 6 using logical layering created by the different routing protocols, a Layer 3 path determination algorithm begins by finding the router that introduced the subnet (specified as the observation point of the fault in the fault object) into the modeled domain. This router and source subnet are the starting point for the path generation. If the destination is in the same subnet as the source, then the subnet model is used to generate a path between the entities—which may result in examining the spanning tree connectivity between the switches and bridges. If the destination is in another subnet, the system executes a router (layer 3) path analysis. If the source is modeled in the system, the algorithm finds the gateway used by the source workstation.

The internal model of the chosen router is used to simulate the path decision to reach the destination. If the router is running OSPF, then the path determination uses the OSPF's shortest-path-first algorithm. Depending on the routing protocol used, a particular diagnoser is invoked to simulate the behavior of the routing decision to choose the next hop router. Moving from hop to hop (in an internal model) the algorithm generates a complete path from the source to the destination. In a subnet, the algorithm uses the Spanning Tree and Bridged LAN models to generate Layer 2 paths between the routers.

Each logical grouping (for example, OSPF route domain, subnets, ATM clouds, etc.) is analyzed by an associated diagnoser. These logical models can take on specific behavior indicative of the protocol they simulate by way of the associated fault diagnoser.

The automated fault analysis is based on a fault handler designed to handle a specific application or technology and on a model of the network environment. The specific fault handler includes both a diagnoser fault handler and a related tester fault handler. For web-based applications, the system includes a fault diagnoser designed to handle web related faults. For e-mail applications, the system includes a fault diagnoser designed to handle e-mail detected problems.

In the preferred implementation, the network model will have fault diagnosers for each of the OSI layers. The system includes generic layer 3 (routing) diagnosers, and specific layer 3 routing diagnosers, like an OSPF diagnoser to handle particular OSPF faults. The system also includes layer 2 diagnosers (for subnets, LANS, switches, bridges, Ports, etc.), ATM diagnosers, and FrameRelay diagnosers. Each diagnoser understands the types of faults in the particular domain that it registers to handle and it knows how to determine the possible causes of a detected fault in its domain.

Furthermore, fault handler 150 may include diagnoser fault handlers 154 and tester fault handlers 152 designed to handle QoS problems, VPNs, Multicast Groups, Wireless connectivity, Cable access, DSL access, or other types of technology. As specifically described below, after a diagnoser finds the possible causes of a detected fault, tester fault handlers are invoked to determine whether the possible faults actually exist and record the test results. Thus, fault testers are strongly related to the fault diagnosers and to the models they query to test for problems. For each type of fault there may be several diagnoser fault handlers and several tester fault handlers.

Fault diagnosers know specific types of problems that may be causing a particular symptom reported in the detected fault. A diagnoser performs domain specific algorithms to determine possible causes. A diagnoser consults the objects that comprise the specific domain and gathers specific subcomponents by following the domain specific dependencies that have been established in the modeled system. A diagnoser may designate as a possible fault, every member of the domain. Alternatively, a diagnoser may generate a specific list of suspect members based on relationships to the parameters found in the input fault.

Ultimately, a tester performs tests on some subset of the objects in its domain. These tests involve access to the real world counterparts that they represent. Sometimes a subcomponent may represent an abstract object (for example, the subnet object in the diagram above). These abstract objects may require further subcomponent analysis in order to determine the cause of the fault being diagnosed. This process can integrate seamlessly without disturbing any of the other existing diagnosers and testers.

A tester may include vendor and device-specific knowledge, which allows it to perform the tests needed to determine if a possible fault actually exists. Diagnosers "know" about components at a particular network layer and rely on the diagnosis capabilities of their constituent subcomponents to examine deeper through the layers as needed. As the system performs its analysis, a log is written to track the decision process made by the system as a whole including the results of the tests, which could be used by a network administrator to troubleshoot a network problem.

Figures 7, 7A:
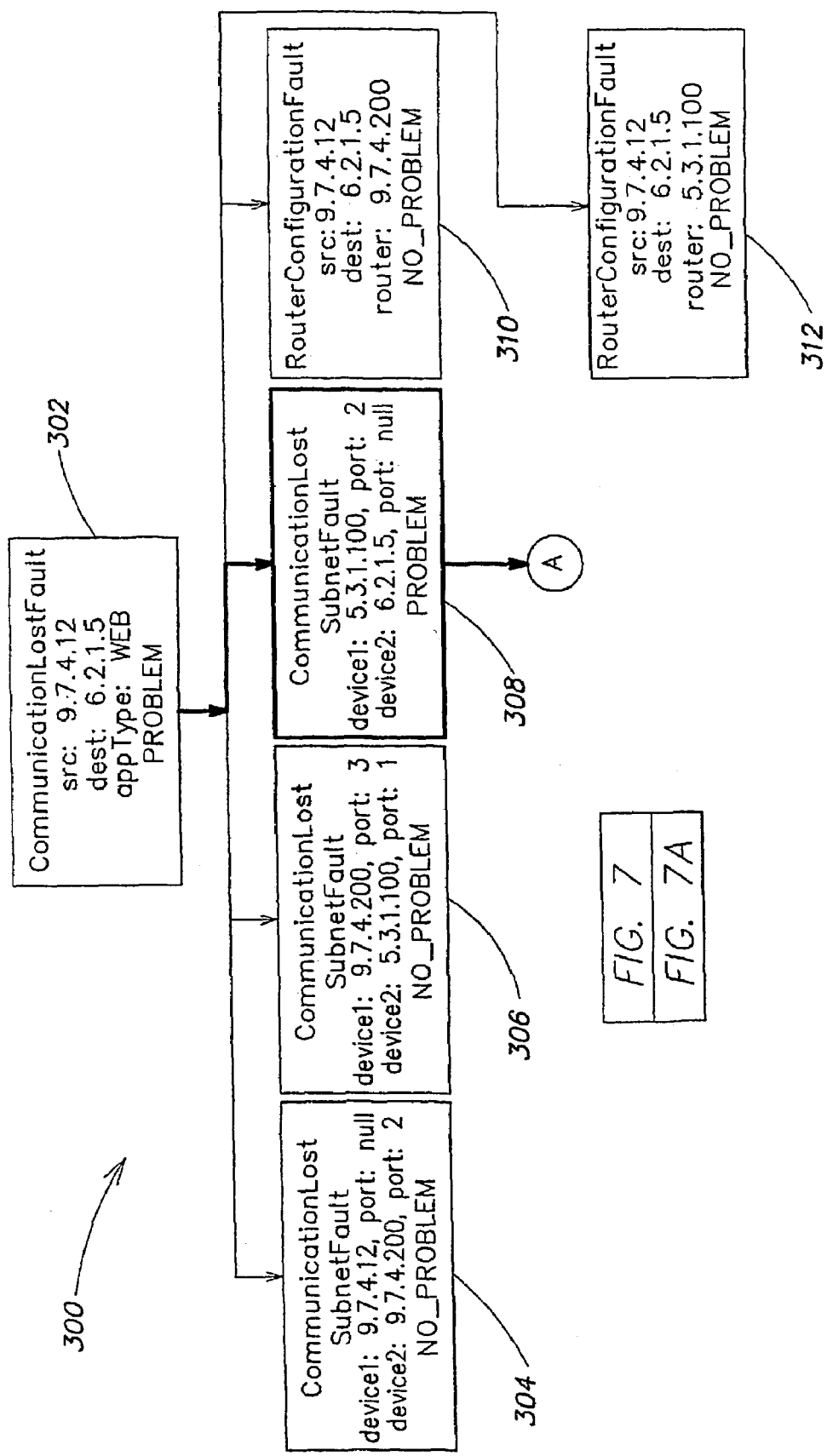
FIGS. 7 and 7A are block diagrams of faults diagnosed in the portion of a communications network shown in FIG. 6.
Figure 7A:
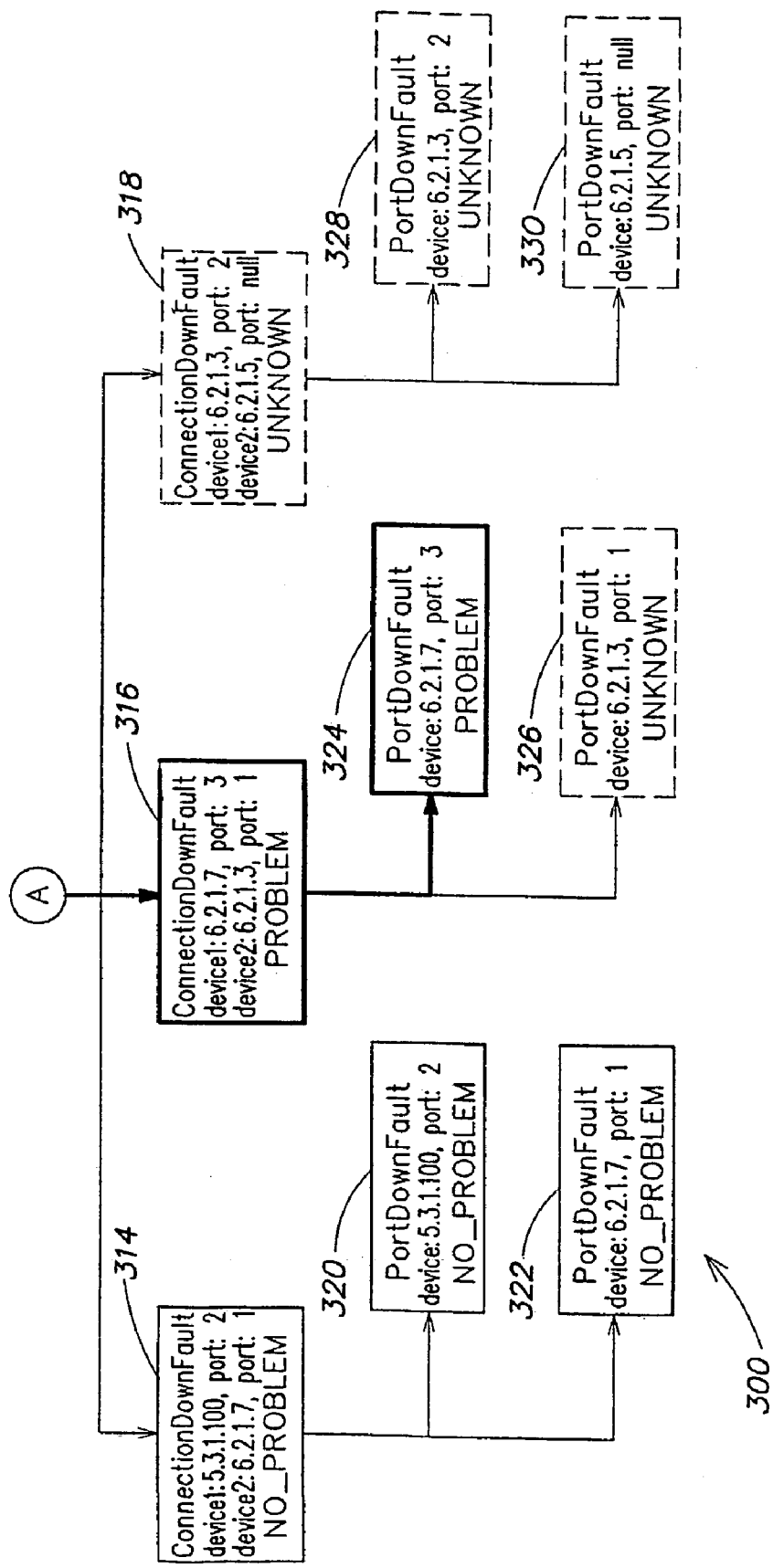

Fault detection and management system 100 utilizes a decomposition approach in the diagnosis of a fault to determine the root cause. Fault detector 130 enters a problem or potential problem into fault object factory 110, which creates a fault object treated as a symptom fault. The symptomatic fault is decomposed into one or more constituent faults that further refine the symptom as shown in FIGS. 7 and 7A. Each constituent fault represents a possible suspect that may be causing the symptom. For each constituent fault, tests are performed to determine the existence of a problem, or the constituent fault is further decomposed into suspects. The process continues until all faults are completely decomposed and there are no more suspects.

The end result of this process is a hierarchy of faults in the form of a tree with the original symptomatic fault at the root (as shown in FIGS. 7 and 7A). The fault tree includes a root fault level, one or several intermediate fault levels, and a leaf fault level. Each fault in the tree, except the root, has at least one parent fault from which it was decomposed. Each fault also has zero or more child faults that were spawned from it by a diagnoser fault handler. A child fault represents a possible cause of its parent. A fault that has children but is not the root is termed an intermediate fault. A fault that has no children, that is one that could not be further decomposed, is termed a leaf fault. A leaf fault that indicates a problem is a probable cause of the root symptom. There may be more than one root cause.

Fault diagnosis engine 101 computes a composite result for two or more child faults according to the following default rules for composite result computation:

1. If any child fault result state is PROBLEM, then the parent fault's result state is PROBLEM;
2. If all child fault result states are NO_PROBLEM, then the parent fault's result is NO_PROBLEM; and
3. Otherwise, the parent fault's result is UNKNOWN.

Using the above rules, the composite result for a parent fault is entered.

Figure 6A:
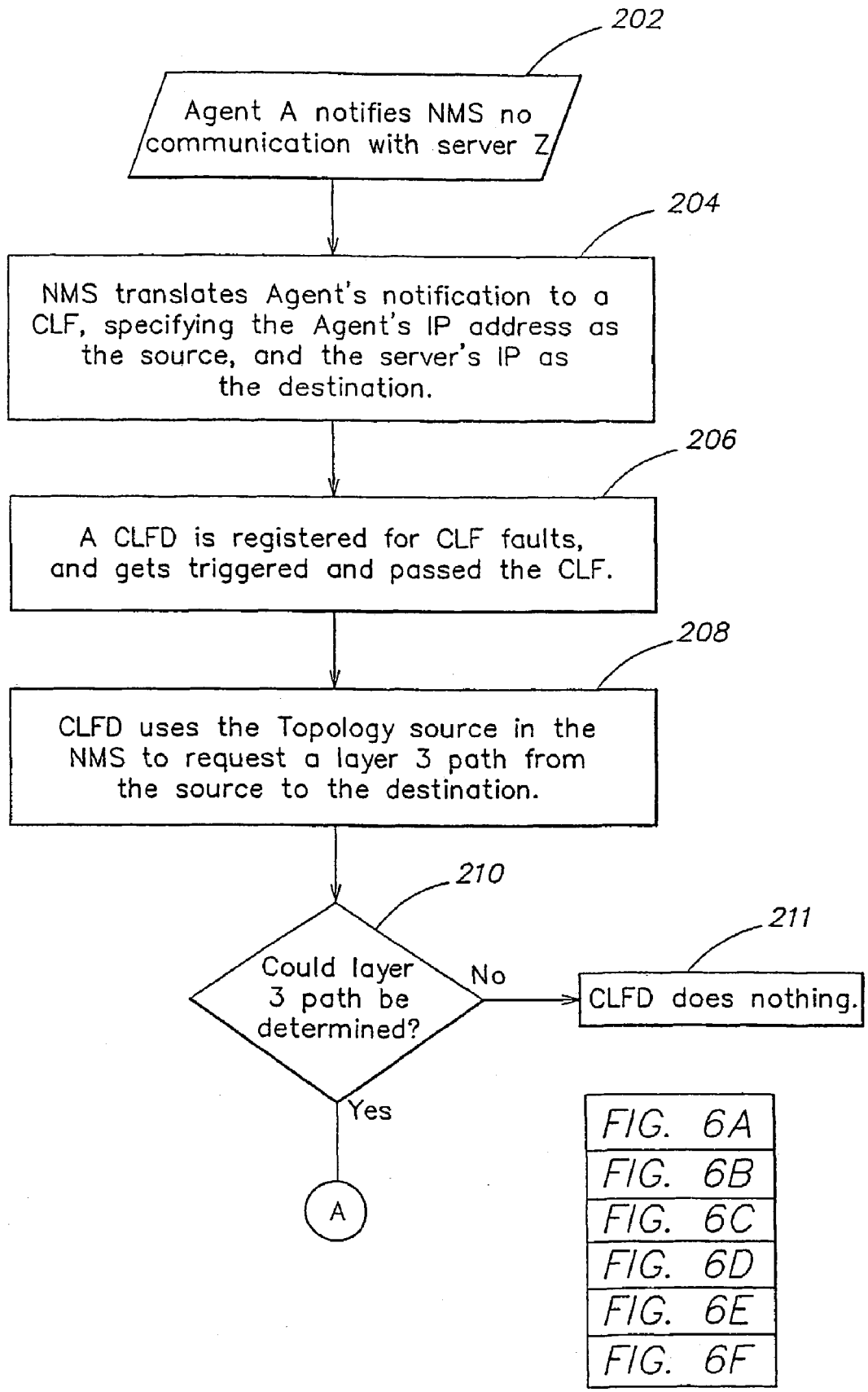
FIGS. 6A, 6B, 6C, 6D, 6E and 6F are flow diagrams used for path dependent fault diagnosis.

FIGS. 6A through 6F illustrate path dependent fault diagnosis in a communications network shown in FIG. 6. Referring to FIGS. 6 and 6A, an agent A in subnet 22 (IP address 9.7.4.12) notifies a network management system (NMS) that it can no longer communicate at all with a server in subnet 28 at IP address 6.2.1.5. (step 202). As notification source, agent A uses an SNMP trap (or another notification method). The NMS translates agent's notification to a CommunicationLost fault (fault 302 in FIG. 7), specifying the agent's IP address as the source, and the server's IP as the destination (step 204). Next, in Step 206, a CommunicationLost fault diagnoser fault handler (CLFD) is registered for CLF faults, and gets triggered. Importantly, a topology source provides a Layer 3 path from the source to the destination (step 208). There are various topology sources known in the prior art. Furthermore, a suitable topology source is also described in a co-pending PCT application entitled "Systems and Methods for Constructing Multi-Layer Topological Models of Computer Networks" (PCT/US01/14767) filed on 7 May 2001 which is incorporated by reference.

The topology source (e.g. topology mapper 14) returns an L3 path that usually includes a "list of paths". Each path is an ordered list of connections from a source device to a destination device specifying each device hop along the way and the port level connectivity. If the Layer 3 path cannot be determined, the CLF diagnoser does nothing (step 211).

Figure 6B:
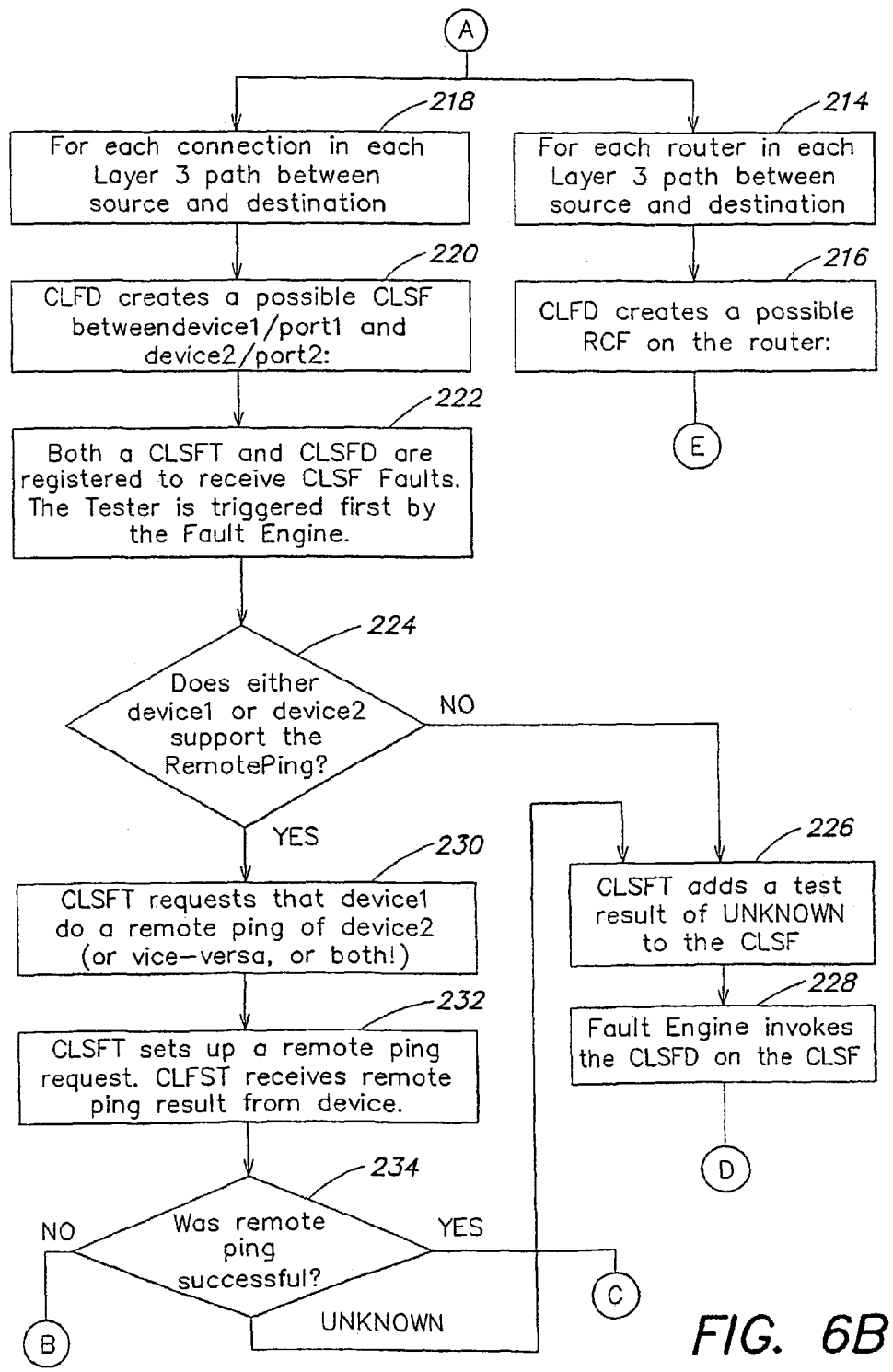
Figure 6C:
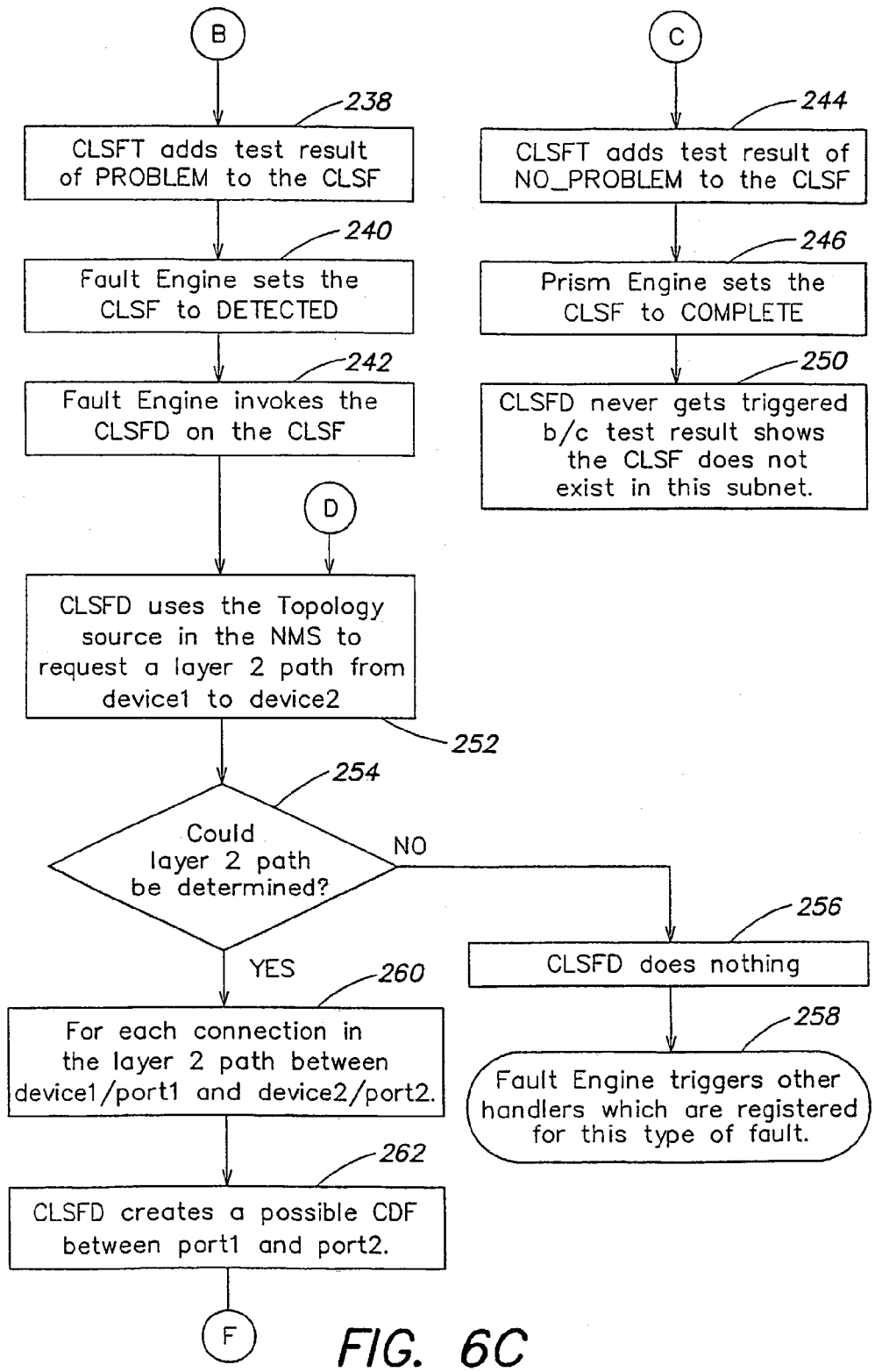

Referring to FIG. 6B, if the Layer 3 path can be determined, then the CLF diagnoser fault handler creates a possible RouterConfiguration fault (RCF) on the router (step 216). This is done for each router in each Layer 3 path between the source and the destination. The RouterConfiguration fault indicates a condition in which the router is preventing traffic from being transmitted from a first device to a second device or vice-versa.

In step 218, for each connection in each Layer 3 path between the source and the destination, the CLF diagnoser fault handler creates a possible CommunicationLostSubnet fault (CLSF) between port 1 of device 1 and port 2 of device 2 (step 220). The CommunicationLostSubnet faults indicate a condition in which traffic cannot be transmitted from device 1 to device 2 within a given subnet. In step 222, fault diagnosis engine 101 registers both a CLSF Tester fault handler (CLSFT) and CLSF Diagnoser fault handler (CLSFD) to receive CLS faults. The CLSF Tester is triggered first by the fault diagnosis engine. CLSFT requests that device 1 do a remote ping of device 2 (or vice-versa, or both) (step 230). The connection list returned from topology mapper 14 includes information about the devices in the connection. The information includes an identity-of the type of the device (i.e., SysDID), and includes the RemotePing Capability (RPC), which is the ability of a device to attempt to contact another device via ICMP and report back the result.

If device 1 or device 2 do not support remote pings, CLSF tester adds a test result of UNKNOWN to the CLSF (step 226). Then, fault diagnosis engine 101 invokes the CLSF diagnoser on the CLS fault (step 228). If devices 1 and 2 support remote pings, the CLSF tester sets up a remote ping request. Then, the CLSF tester receives a remote ping result from device 1 and 2 (step 232), and determines if the remote ping was successful (step 234).

In step 238, if the remote ping was not successful, the CLSF tester adds test result of PROBLEM to the CLS fault. Then, fault engine 101 sets the CLS fault to the detected state (step 240). Next, fault diagnosis engine 101 invokes the CLSF diagnoser on the CLS fault (step 242). If the remote ping was successful, the CLSF tester adds test result of NO_PROBLEM to the CLS fault (step 244). Next, fault diagnosis engine 101 sets the CLS fault to the completed state (step 246). In this case, the CLSF diagnoser never gets triggered because test results shows the CLS fault does not exist in this subnet (step 250).

The CLSF diagnoser uses the topology source in the NMS to request a Layer 2 path from device 1 to device 2 (step 252). If Layer 2 path cannot be determined, the CLSF diagnoser does nothing (step 256). Then, fault diagnosis engine 101 triggers other handlers that are registered for this type of fault (step 258). If layer 2 path can be determined for each connection in the Layer 2 path, between port 1 of device 1 and port 2 of device 2, the CLSF diagnoser creates a possible ConnectionDownFault (CDF) between port 1 and port 2 (step 262). The ConnectionDown fault (see faults 314, 316, and 318 in FIG. 7A) is a fault indicative of a condition in which the traffic cannot be transmitted between the two ports of the corresponding devices 1 and 2.

Figure 6D:
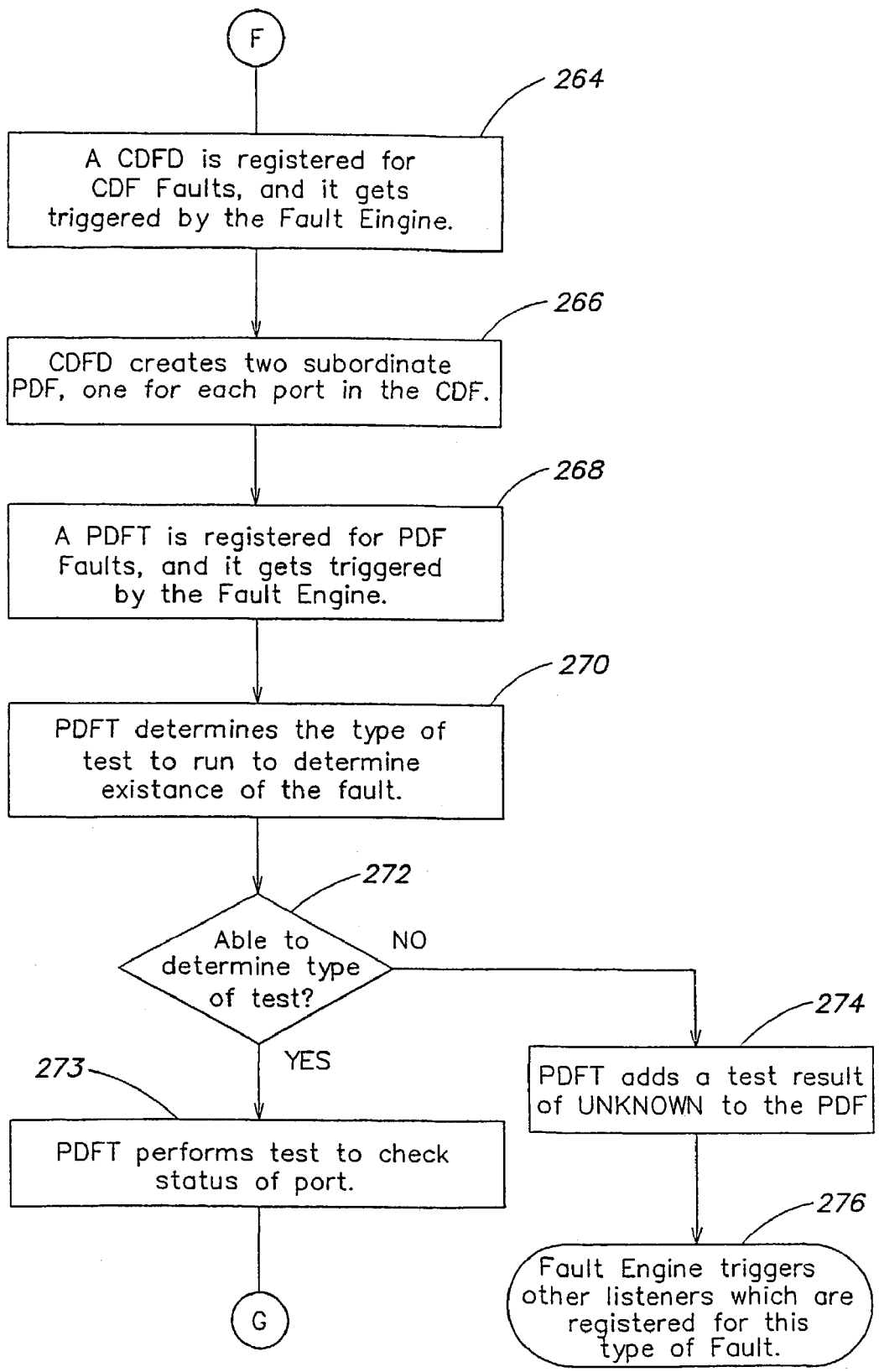

Referring to FIG. 6D, if the CDF diagnoser (CDFD) is registered for the CDF faults, fault diagnosis engine 101 triggers the CDF diagnoser (step 264). The CDF diagnoser creates two subordinate PortDownFaults (PDF) (see, e.g., 320 and 322 in FIG. 7A), one for each port in the CDF (step 266).

If the PDF tester (PDFT) is registered for PDF Faults, fault diagnosis engine 101 triggers the PDF tester (step 268). The PDF tester then determines the type of test to run to determine existence of the fault (step 270). If the PDF tester is able to determine the type of test, the PDF tester performs test to check status of port (step 273). For example, if the port has a manifestation in the MIB-II ifTable of the device's SNMP agent, the PDFT would read the ifOperStatus of this port, and compare the value to a set of known good values (generally, ON (1) is the only good value). If the port's ifOperStatus value is included in the set of good values for ifOperStatus, the result state 125 of the created test result object 120 is NO_PROBLEM; otherwise, it is PROBLEM. Regardless of the test state, the actual value of the ifOperStatus is recorded in the test data 124.

If the PDF tester cannot determine the type of test, the PDF tester adds a test result of UNKNOWN to the PDF (step 274), as shown by fault 328 in FIG. 7A. Then, fault diagnosis engine 101 triggers other listeners that are registered for this type of fault (step 276).

Figure 6E:
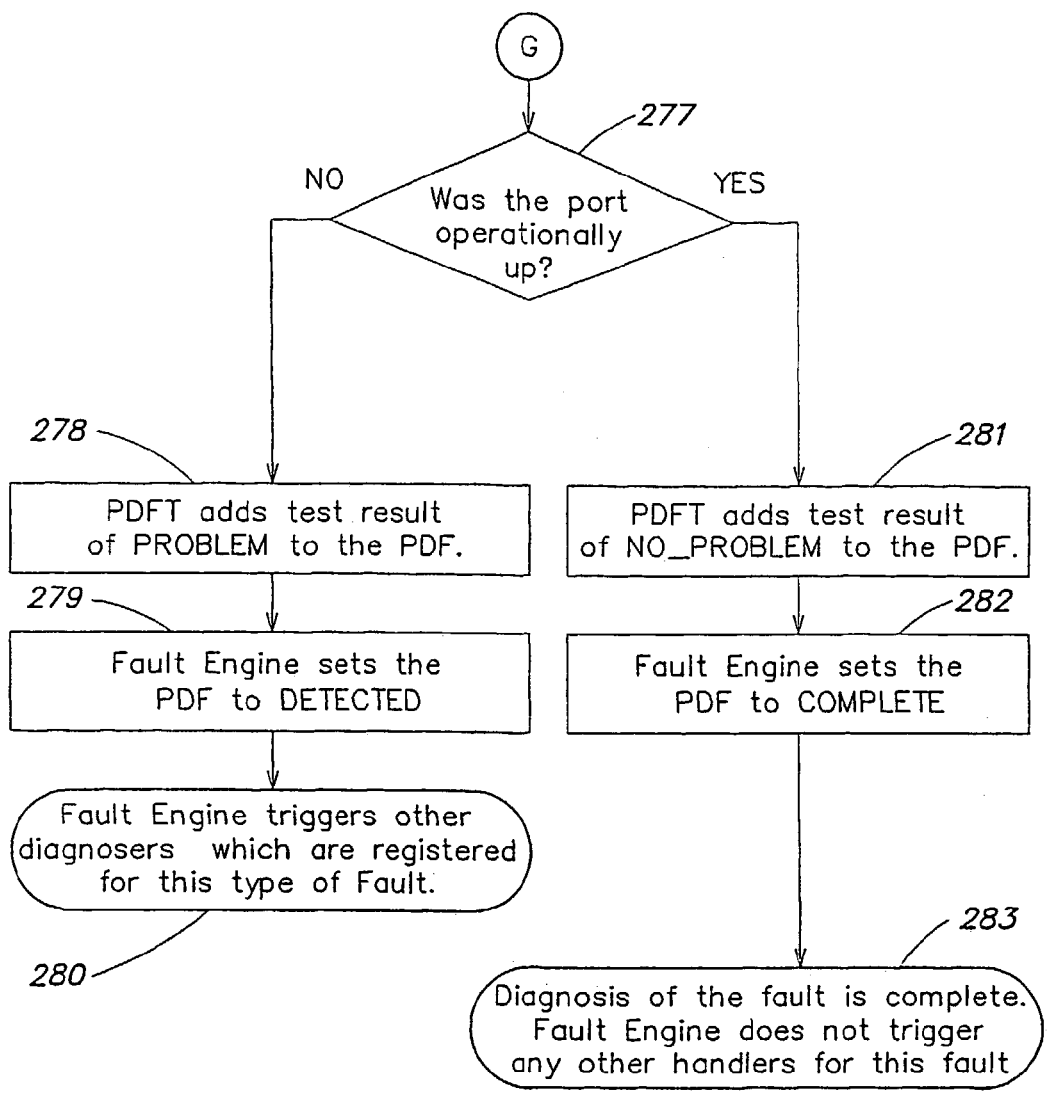

Referring to FIG. 6E, if the PDF tester determines that the port was operationally up, the PDF tester sets the PDF fault to NO_PROBLEM (step 281), and fault diagnosis engine 101 sets the PDF to the completed state. After setting PDF to the completed state, the diagnosis of the fault is complete. Fault diagnosis engine 101 does not trigger any other handlers for this fault (step 283).

On the other hand, if the PDF tester determines that the port was down (step 277), the PDF tester adds, in step 281, test result of PROBLEM to the PDF fault (see, e.g., 324 of FIG. 7A). Then, fault diagnosis engine 101 sets the PDF to be the detected state. Next, fault diagnosis engine 101 triggers other diagnosers that are registered for this type of fault (i.e., PDF).

Figure 6F:
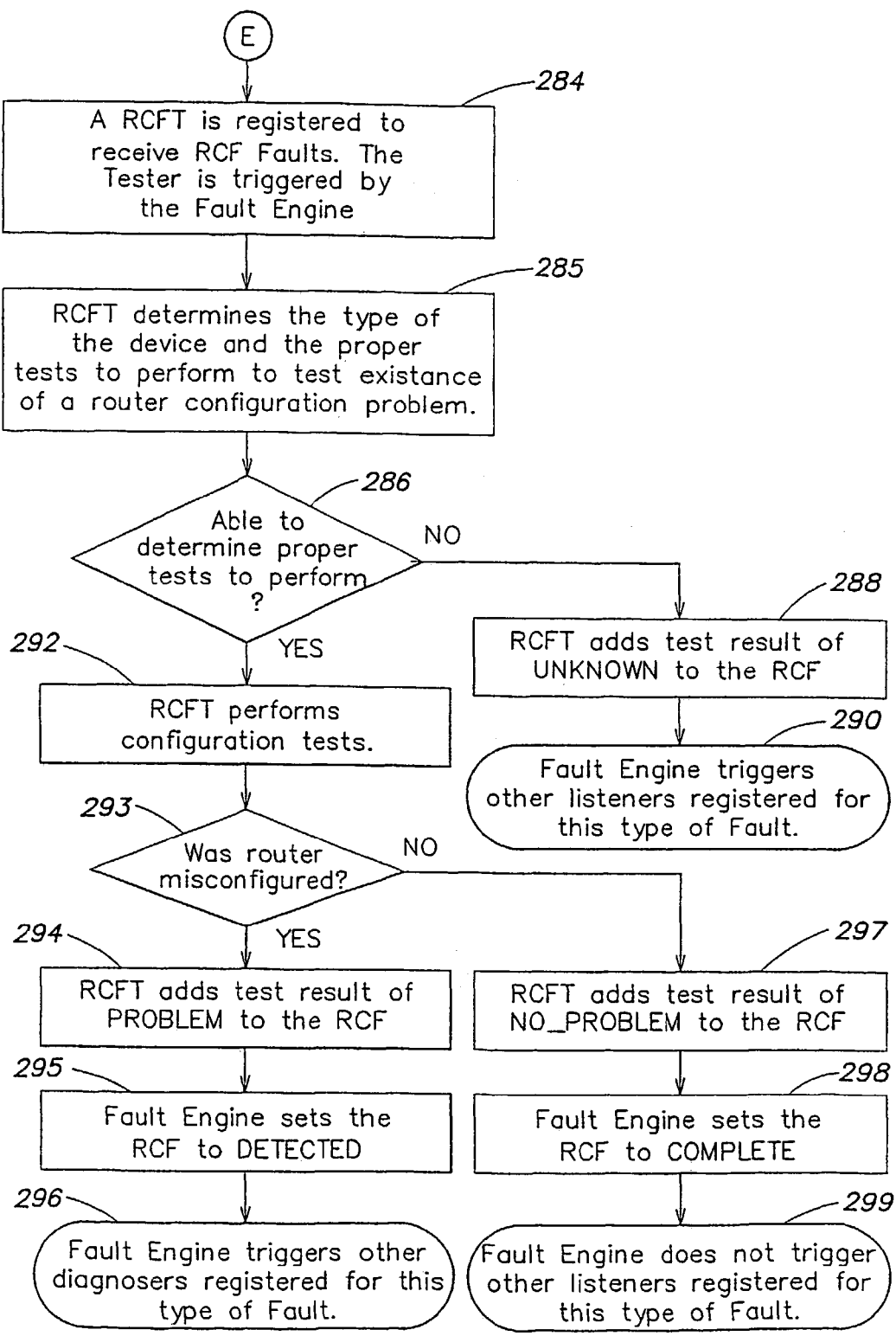

FIG. 6F shows steps taken regarding a possible RouterConfiguration fault. If an RCF tester (RCFT) is registered to receive RDF faults, fault diagnosis engine 101. triggers the RCF tester (step 284). Next, the RCF tester determines the type of the device and the proper tests to perform to test existence of a router configuration problem (step 285). For example, if the router's SNMP agent supports a route forwarding database, such as the MIB-II ipRouteTable or the ipCidrTable (defined in rfc 2096), the forwarding database would be queried to see if a static route had been configured causing the traffic flow to deviate from the intended flow according to the routing protocol(s) running on the router. Other configuration and implementation errors can also be detected. Any condition detected on the router that could adversely impact the forwarding of data from the source to the destination, will cause the test result for the RouterConfiguration fault to have a result state of PROBLEM. If the RCF tester is not able to determine proper tests to perform for testing router configuration (step 286), then the RCF tester adds a test result of UNKNOWN to the RCF fault (step 288). Fault diagnosis engine 101 triggers other listeners registered for this type of fault (step 290).

If the RCF tester is able to determine the type of the device and the proper tests to perform to test existence of a router configuration problem, the RCF tester performs these configuration tests (step 292). The tests determine whether the tested router is misconfigured (step 293). If the tested router is misconfigured, the RCF tester adds test result of PROBLEM to the RCF fault (step 294). Next, fault diagnosis engine 101 sets the RCF to the detected state (step 295). Then, fault diagnosis engine 101 triggers other diagnosers registered for this type of fault (step 296).

If the RCF tester determines that the tested router is not misconfigured (step 293), the RCF tester adds test result of NO_PROBLEM to the RCF fault (step 297). Next, fault diagnosis engine 101 sets the RCF to the completed state (step 298). Then, fault diagnosis engine 101 triggers other listeners registered for this type of fault (step 299).

Numerous other embodiments not described in detail here can apply the principles described to particular applications and are within the scope of the claims.

What is claimed is:

1. A method of diagnosing a fault in a communications network, comprising the acts of:
   receiving fault data from one or more computer-implemented automatic fault detectors associated with the communications network;
   creating at least one fault object from the received fault data;
   determining, in response to receiving said fault data, a path in the communications network related to said fault data; and
   performing, using said path, a fault analysis on said fault data to diagnose a fault related to the communications network, wherein said fault analysis is a root cause analysis that includes triggering a specific fault handler, and wherein triggering said fault handler includes obtaining an ordered list of fault handlers for a specified transition state of the at least one fault object.

2. The method of claim 1 wherein said determining a path includes performing a domain-specific algorithm.

3. The method of claim 2 wherein said path determination includes dynamically generating a trace route by employing a path-tracing algorithm.

4. The method of claim 1 wherein said determining a path includes employing data stored in a topology mapper.

5. The method of claim 1 wherein said determining a path includes using routing and switching algorithms used by the network for data forwarding.

6. The method of claim 1 wherein said determining a path includes performing a layer 3 path determination.

7. The method of claim 6 wherein said performing said layer 3 path determination includes finding a router in a subnet and using said router as a starting point for path generation.

8. The method of claim 1 wherein creating a fault object includes creating a fault object in a fault object factory using said received fault data.

9. The method of claim 1 wherein said receiving fault data includes using a detector.

10. The method of claim 1 wherein said using a detector includes using an agent.

11. The method of claim 1 wherein said triggering said fault handler includes employing a diagnoser fault handler.

12. The method of claim 11 wherein said employing said diagnoser fault handler includes generating possible faults that may caused occurrence of said fault data.

13. The method of claim 11 wherein said diagnoser fault handler is designed to handle QoS problems.

14. The method of claim 11 wherein said diagnoser fault handler is designed to handle problems in virtual private networks.

15. The method of claim 11 wherein said diagnoser fault handler is designed to handle problems in multi-cast groups.

16. The method of claim 11 wherein said diagnoser fault handler is designed to handle wireless connectivity problems.

17. The method of claim 11 wherein said diagnoser fault handler is designed to handle problems related to cable access.

18. The method of claim 11 wherein said diagnoser fault handler is designed to handle problems related to DSL access.

19. The method of claim 11 wherein said employing diagnoser fault handler includes transitioning fault object between processing states.

20. The method of claim 1 wherein said triggering said fault handler includes employing a tester fault handler.

21. The method of claim 20 wherein said triggering said fault handler includes employing a tester fault handler of each said possible fault.

22. The method of claim 1 wherein said obtaining said ordered list includes employing a diagnoser fault handler registered for the type of the analyzed object.

23. The method of claim 1 further including prioritization.

24. The method of claim 1 further including fault presentation that displays fault result to a user.

25. A system for diagnosing a fault in a communications network, comprising:
   a fault object factory constructed and arranged to receive fault data from one or more computer-implemented automatic fault detectors associated with the communications network and create fault objects;
   a path determination module constructed to determine, in the communications network, a path related to said fault data;
   a fault diagnosis engine constructed to perform, using said path, a fault analysis on said fault data to diagnose a fault related to the communications network; and
   a fault handler constructed to perform analysis of said fault objects that includes a diagnoser fault handler constructed and arranged to change a fault state of one or more of said fault objects.

26. The system of claim 25 wherein, the one or more fault detectors are constructed and arranged to detect a fault in a monitored entity.

27. The system of claim 25 wherein said fault handler includes a fault handler tester.

28. A system for diagnosing a fault in a communications network, comprising:
- a fault object factory constructed and arranged to receive fault data from one or more computer-implemented automatic fault detectors associated with the communications network and create fault objects;
- a path determination module constructed to determine, in the communications network, a path related to said fault data;
- a fault diagnosis engine constructed to perform, using said path, a fault analysis on said fault data to diagnose a fault related to the communications network; and
- a fault repository constructed and arranged for storing and accessing fault objects, wherein said fault repository includes said fault objects and at least one fault association object.

29. A system for diagnosing a fault in a communications network, comprising:
- a fault object factory constructed and arranged to receive fault data from one or more computer-implemented automatic fault detectors associated with the communications network and create fault objects;
- a path determination module constructed to determine, in the communications network, a path related to said fault data; and
- a fault diagnosis engine constructed to perform, using said path, a fault analysis on said fault data to diagnose a fault related to the communications network, wherein each of said fault objects include a description, a processing state, and test result object, and wherein said test result object includes a description, a target entity, test data, and a result state.

30. A method of diagnosing a fault in a communications network, comprising the acts of:
- receiving fault data regarding one or more faults from a computer-implemented automatic fault detector on the communications network;
- creating at least one fault object from the fault data;
- creating one or more fault association objects using associations between the one or more fault objects;
- storing the one or more fault objects and the one or more fault association objects in a fault repository;
- determining at least one path in the communications network related to said fault data; and
- performing, based on said at least one path, the one or more fault objects, and the one or more fault association objects, a fault analysis on said fault data to diagnose a fault related to the communications network, wherein the fault analysis determines at least a cause of the fault.

31. A network management system, comprising a fault diagnosis system connectable to a communications network, comprising:
- a fault object factory residing on the communications network constructed and arranged to receive fault data from one or more computer-implemented automatic fault detectors associated with the communications network and create a fault object from the fault data, wherein the fault object includes a processing state;
- a path determination module constructed to determine, in the communications network, a path related to said fault data; and
- a fault diagnosis engine constructed to perform, based on said path, a fault analysis on the fault object to diagnose a fault related to the communications network, wherein the fault analysis determines at least a cause of the fault,
- wherein said fault diagnosis engine utilizes one or more fault handlers to perform the fault analysis, wherein the processing state of the fault object determines which of the one or more fault handlers is used in the fault analysis, and wherein the one or more fault handlers modify the processing state of the fault object during fault analysis.

* * * * *